United States Patent
Chen et al.

(10) Patent No.: US 9,147,874 B2
(45) Date of Patent: Sep. 29, 2015

(54) RECHARGEABLE LITHIUM CELL HAVING A MESO-POROUS CONDUCTIVE MATERIAL STRUCTURE-SUPPORTED PHTHALOCYANINE COMPOUND CATHODE

(75) Inventors: Guorong Chen, Fairborn, OH (US);
Yanbo Wang, Fairborn, OH (US);
Aruna Zhamu, Centerville, OH (US);
Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 596 days.

(21) Appl. No.: 13/507,168

(22) Filed: Jun. 11, 2012

(65) Prior Publication Data
US 2013/0330611 A1   Dec. 12, 2013

(51) Int. Cl.
| | |
|---|---|
| H01M 4/13 | (2010.01) |
| H01M 4/60 | (2006.01) |
| H01M 4/58 | (2010.01) |
| H01M 4/137 | (2010.01) |
| B82Y 30/00 | (2011.01) |
| H01M 4/1399 | (2010.01) |
| H01M 4/62 | (2006.01) |
| H01M 4/76 | (2006.01) |
| H01M 10/052 | (2010.01) |

(52) U.S. Cl.
CPC ............ *H01M 4/137* (2013.01); *B82Y 30/00* (2013.01); *H01M 4/1399* (2013.01); *H01M 4/608* (2013.01); *H01M 4/625* (2013.01); *H01M 4/762* (2013.01); *H01M 10/052* (2013.01); *Y02E 60/122* (2013.10)

(58) Field of Classification Search
USPC .................................. 429/213, 231.95, 218.1
IPC ......................... H01M 4/60,4/405, 4/96, 4/583
See application file for complete search history.

(56) References Cited

U.S. PATENT DOCUMENTS

| | | |
|---|---|---|
| 4,251,607 A | 2/1981 | Yamaki et al. |
| 2011/0076560 A1* | 3/2011 | Scordilis-Kelley et al. ................. 429/218.1 |

OTHER PUBLICATIONS

U.S. Appl. No. 11/800,728, filed May 8, 2007, A. Zhamu, et al.
J. Yamaki and A. Yamaji, "Phthalocyanine cathode materials for secondary lithium cells," Electrochemical Society Journal, vol. 129, Jan. 1982, p. 5-9.

* cited by examiner

*Primary Examiner* — Patrick Ryan
*Assistant Examiner* — Julian Anthony

(57) ABSTRACT

A rechargeable lithium cell comprising: (a) an anode comprising a prelithiated lithium storage material or a combination of a lithium storage material and a lithium ion source; (b) a hybrid cathode active material composed of a meso-porous structure of a carbon, graphite, metal, or conductive polymer and a phthalocyanine compound, wherein the meso-porous structure is in an amount of from 1% to 99% by weight based on the total weight of the meso-porous structure and the phthalocyanine combined, and wherein the meso-porous structure has a pore with a size from 2 nm to 50 nm to accommodate phthalocyanine compound therein; and (c) an electrolyte or electrolyte/separator assembly. This secondary cell exhibits a long cycle life and the best cathode specific capacity and best cell-level specific energy of all rechargeable lithium-ion cells ever reported.

32 Claims, 15 Drawing Sheets

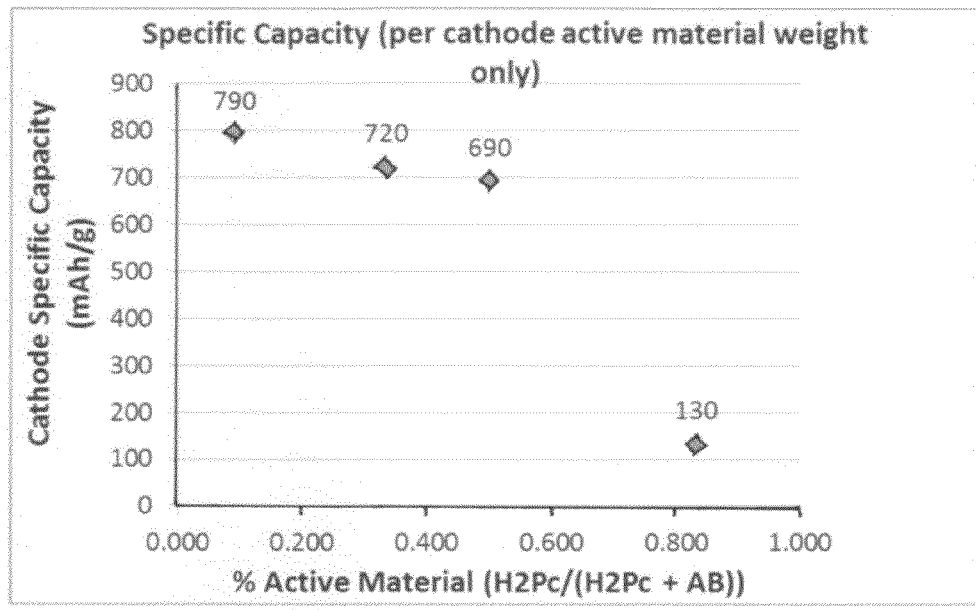
FIG. 1(A) Prior art (Yamaki, et al.)
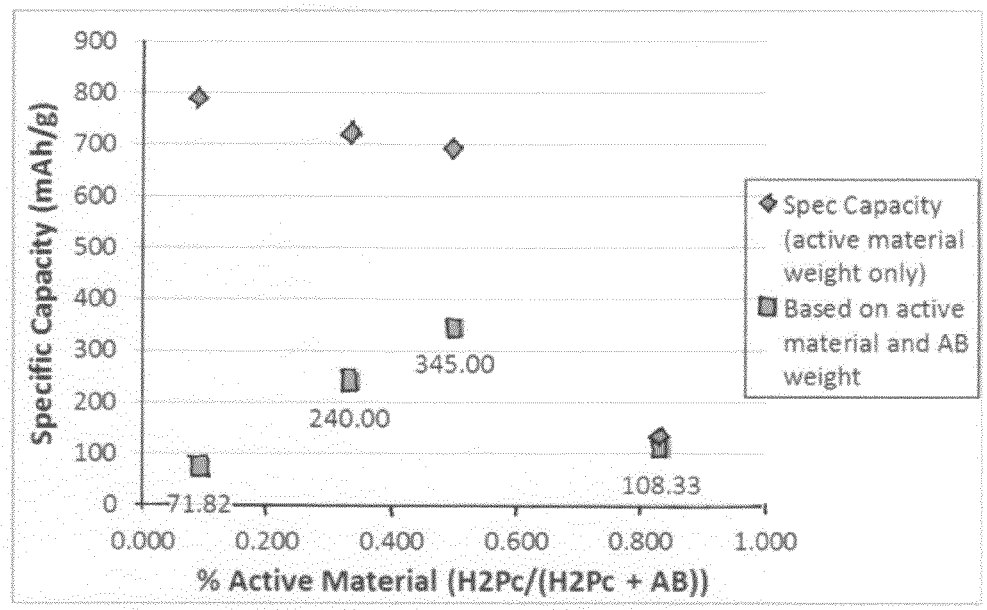
FIG. 1(B) Prior art (Yamaki, et al.)

RECHARGEABLE LITHIUM CELL HAVING A MESO-POROUS CONDUCTIVE MATERIAL STRUCTURE-SUPPORTED PHTHALOCYANINE COMPOUND CATHODE

This application claims the benefits of the following co-pending application: Guorong Chen, Yanbo Wang, Aruna Zhamu, and Bor Z. Jang, "Rechargeable Lithium Cell Having a Phthalocyanine-Based High-Capacity Cathode," U.S. patent application Ser. No. 13/506,778 (May 17, 2012).

FIELD OF THE INVENTION

This invention relates generally to the field of rechargeable (secondary) lithium metal or lithium-ion batteries and, more particularly, to a rechargeable lithium metal or lithium-ion cell having a phthalocyanine-based high-capacity cathode.

BACKGROUND OF THE INVENTION

Historically, today's most favorite rechargeable energy storage devices—lithium-ion batteries—actually evolved from rechargeable "lithium metal batteries" using lithium (Li) metal as the anode and a Li intercalation compound as the cathode. Li metal is an ideal anode material due to its light weight (the lightest metal), high electronegativity (−3.04 V vs. the standard hydrogen electrode), and high theoretical capacity (3,860 mAh/g). Based on these outstanding properties, lithium metal batteries were proposed 40 years ago as an ideal system for high energy-density applications. During the mid-1980s, several prototypes of rechargeable Li metal batteries were developed. A notable example was a battery composed of a Li metal anode and a molybdenum sulfide cathode, developed by MOLI Energy, Inc. (Canada). This and several other batteries from different manufacturers were abandoned due to a series of safety problems caused by sharply uneven Li growth (formation of Li dendrites) as the metal was re-plated during each subsequent recharge cycle. As the number of cycles increases, these dendritic or tree-like Li structures could eventually traverse the separator to reach the cathode, causing internal short-circuiting.

To overcome these safety issues, several alternative approaches were proposed in which either the electrolyte or the anode was modified. The first approach involved replacing Li metal by graphite (another Li insertion material) as the anode. The operation of such a battery involves shuttling Li ions between two Li insertion compounds, hence the name "Li-ion battery. Presumably because of the presence of Li in its ionic rather than metallic state, Li-ion batteries are inherently safer than Li-metal batteries. The second approach entailed replacing the liquid electrolyte by a dry polymer electrolyte, leading to the Li solid polymer electrolyte (Li-SPE) batteries. However, Li-SPE has seen very limited applications since it typically requires an operating temperature of up to 80° C.

The past two decades have witnessed a continuous improvement in Li-ion batteries in terms of energy density, rate capability, and safety, and somehow the significantly higher energy density Li metal batteries have been largely overlooked. However, the use of graphite-based anodes in Li-ion batteries has several significant drawbacks: low specific capacity (theoretical capacity of 372 mAh/g as opposed to 3,860 mAh/g for Li metal), long Li intercalation time (e.g. low solid-state diffusion coefficients of Li in and out of graphite and inorganic oxide particles) requiring long recharge times (e.g. 7 hours for electric vehicle batteries), inability to deliver high pulse power (power density <0.5 kW/kg), and necessity to use pre-lithiated cathodes (e.g. lithium cobalt oxide), thereby limiting the choice of available cathode materials. Further, these commonly used cathodes have a relatively low specific capacity (typically <200 mAh/g). These factors have contributed to the two major shortcomings of today's Li-ion batteries—a low energy density (typically 150-180 Wh/$kg_{cell}$) and low power density (typically <0.5 kW/kg).

Although several high-capacity anode active materials have been found (e.g., Si with a theoretical capacity of 4,200 mAh/g), there has been no corresponding high-capacity cathode material available. To sum it up, battery scientists have been frustrated with the low energy density of lithium-ion cells for over three decades!

In summary, current cathode active materials commonly used in Li-ion batteries have the following serious drawbacks:

(1) The practical capacity achievable with current cathode materials (e.g. lithium iron phosphate and lithium transition metal oxides) has been limited to the range of 150-250 mAh/g and, in most cases, less than 200 mAh/g.
(2) The production of these cathode active materials normally has to go through a high-temperature sintering procedure for a long duration of time, a tedious, energy-intensive, and difficult-to-control process.
(3) The insertion and extraction of lithium in and out of these commonly used cathodes rely upon extremely slow solid-state diffusion of Li in solid particles having very low diffusion coefficients (typically $10^{-8}$ to $10^{-14}$ cm$^2$/s), leading to a very low power density (another long-standing problem of today's lithium-ion batteries).
(4) The current cathode materials are electrically and thermally insulating, not capable of effectively and efficiently transporting electrons and heat. The low electrical conductivity means high internal resistance and the necessity to add a large amount of conductive additives, effectively reducing the proportion of electrochemically active material in the cathode that already has a low capacity. The low thermal conductivity also implies a higher tendency to undergo thermal runaway, a major safety issue in lithium battery industry.
(5) The most commonly used cathodes, including lithium transition metal oxides and lithium iron phosphate, contain a high oxygen content that could assist in accelerating the thermal runaway and provide oxygen for electrolyte oxidation, increasing the danger of explosion or fire hazard. This is a serious problem that has hampered the widespread implementation of electric vehicles.

For use in a rechargeable lithium metal battery (i.e. a secondary battery using lithium metal as an anode-active material), the chalcogenide is the most studied cathode-active material. The chalcogenide is formed of the sulfides, selenides or tellurides of titanium, zirconium, hafnium, niobium, tantalum, or vanadium. A largely overlooked class of cathode active materials is phthalocyanine. There was an earlier attempt to use phthalocyanine-based cathode in a lithium metal battery [J. Yamaki and A. Yamaji, "Phthalocyanine cathode materials for secondary lithium cells," Electrochemical Society Journal, vol. 129, January 1982, pp. 5-9; J. Yamaki and A. Yamaji, U.S. Pat. No. 4,251,607, Feb. 17, 1981]. In addition to the aforementioned dendrite problem, these cathodes (both chalcogenide and phthalocyanine) and related lithium metal batteries suffer from many major issues:

(a) These cathode active materials are electrically insulating and, hence, require the use of a large amount of conductive additives (e.g. carbon black, CB, or acetylene black, AB) that are electrochemically inactive materials (not contributing to lithium storage, yet adding extra weights to the cell). For instance, in Yamaki et al (1982) cited above, for every 0.1 grams of metal phthalocyanine, 0.1 grams of acetylene were added. With another 10% by weight of a resin binder, the proportion of the cathode active material alone (phthalocyanine itself) in the cathode is less than 50% by weight.

By plotting the cathode specific capacity data listed in Table 1 of Yamaki, et al (1982) we obtained FIG. 1(A), which indicates that the lithium storing capacity per gram of the cathode active material only (hydrogen phthalocyanine, H2Pc) actually decreases with the increasing proportion of the active material amount (or decreasing acetylene black proportion). It is very disturbing that at least 50% by wt. of AB is required. If the weight of acetylene black (AB, a conductive additive) is accounted for, the cathode specific capacity is down to unacceptable values of 71.8-345 mAh/g (of the H2Pc and AB weights combined, not counting the resin binder weight), as indicated in FIG. 1(B). These are much lower than what can be achieved with the theoretical capacity (800-900 mAh/g) of H2Pc.

(b) These lithium metal cells exhibit very poor rate capability. In other words, their lithium storing capacity drops significantly when a higher charge/discharge rate or higher current density is imposed on the cells. Table 2 of Yamaki, et al (1982) indicates that the specific energies of manganese phthalocyanine (MnPc), iron phthalocyanine (FePc), cobalt phthalocyanine (CoPc), and nickel phthalocyanine (NiPc) based on the active material weight alone were 2240, 2300, 1530, and 2220 Wh/kg (of active material weight), respectively, when the discharge current density was at 1 mA (or 5 mA/g based on the combined metal Pc/AB weight of 0.2 g). When the discharge current was increased to 3.14 mA for 0.2 g (or 15.7 mA/g, still a very low discharge rate), the corresponding specific energies dropped to 430, 730, 410, and 370 Wh/kg (of active material weight only), respectively. By dividing these energy density values by a factor of 5, one obtains the estimated cell-level energy densities of 86, 146, 82, and 74 Wh/g that are much lower than those of current lithium-ion cells. These are unacceptably low for consumer electronics, power tool, renewable energy storage, and electric vehicle power applications.

(c) These cells are not very reversible and typically have very poor cycling stability and short cycle life. For instance, according to FIG. 10 of Yamaki, et al (1982), most of the cathode specific capacity dropped to an unacceptably low vale in less than 30 cycles (the best was only 100 cycles, for Cu phthalocyanine).

(d) Most of these cathode active materials are slightly soluble in the liquid electrolyte, gradually losing the amount of cathode active material available for lithium storage. This is more severe for phthalocyanine compounds wherein the anions are highly soluble in commonly used lithium cell electrolytes (e.g. metal phthalocyanine has high solubility below 1 volt vs. $Li/Li^+$). This is one major reason why the cycling stability of these cells is so poor.

(e) All the metal phthalocyanine compounds (MPc) have a catalytic effect on decomposition of electrolytes, creating cycle reversibility and long-term stability issues.

Thus, it is an object of the present invention to provide a phthalocyanine compound-based high-capacity cathode active material (preferably with a specific capacity much greater than 300 mAh/g) for use in a secondary lithium cell (either lithium metal cell or lithium-ion cell) having a long cycle life.

It is another object of the present invention to provide a rechargeable lithium cell featuring a phthalocyanine compound-based high-capacity cathode active material exhibiting a cathode specific capacity greater than 500 mAh/g, typically greater than 1,000 mAh/g, preferably greater than 1,500 mAh/g, or even greater than 2,100 mAh/g.

It is still another object of the present invention to provide a high-capacity cathode active material (with a specific capacity significantly greater than 300 mAh/g, up to 2,200 mAh/g) that can be readily prepared without going through an energy-intensive sintering process.

Another object of the present invention is to provide a high-capacity cathode active material (with a specific capacity greater than 300 mAh/g or even greater than 2,100 mAh/g) that is amenable to being lithium intercalation-free or fast lithium intercalation, leading to a significantly improved power density.

Yet another object of the present invention is to provide a high-capacity cathode active material that is electrically and thermally conductive, enabling high-rate capability and effective heat dissipation.

It is still another object of the present invention to provide a high-capacity cathode active material that contains little or no oxygen, reducing or eliminating the potential fire hazard or explosion.

Still another object of the present invention is to provide a rechargeable lithium cell that has a long charge-discharge cycle life (>300 cycles, preferably >500 cycles, and most preferably >1,000 cycles) and has a phthalocyanine compound-based high-capacity cathode active material that is not significantly soluble in the electrolyte used.

It is an ultimate object of the present invention to provide a high energy density, rechargeable lithium cell that features a high-capacity cathode active material and exhibits an energy density significantly greater than the best of existing Li-ion cells.

SUMMARY OF THE INVENTION

The present invention provides a rechargeable lithium cell, including the lithium metal secondary cell and the lithium-ion secondary cell that accomplishes all of the aforementioned objectives. No prior art teaching, alone or in combination with other teachings, has taught, suggested, or anticipated the instant invention.

In one preferred embodiment, the rechargeable lithium cell comprises:

(a) An anode comprising an anode active material, wherein the anode active material is a prelithiated lithium storage material or a combination of a lithium storage material and a lithium ion source selected from lithium metal, lithium alloy, or lithium-containing compound;

(b) A cathode comprising a hybrid cathode active material composed of a meso-porous structure of a carbon, graphite, metal, or conductive polymer and a phthalocyanine compound, wherein the meso-porous structure is in an amount of from 1% to 99% by weight based on the total weight of the meso-porous structure and the phthalocyanine compound combined, and wherein the meso-porous structure has a meso-scale pore with a size from 2 nm to 50 nm to accommodate phthalocyanine compound therein; and (c) An electrolyte or combined electrolyte/porous separator, wherein the separator is disposed between the anode and the cathode and the electrolyte in ionic contact with the anode and the cathode.

Preferably, the meso-porous structure is in an amount of from 5% to 50% by weight and, more preferably, from 10% to 30% by weight. The phthalocyanine compound may be advantageously selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The meso-porous structure, having a pore size from 2 nm to 50 nm, may be made from a material selected from graphene, graphene oxide, reduced graphene oxide, graphene fluoride, doped graphene, functionalized graphene, expanded graphite with an inter-graphene spacing greater than 0.4 nm, exfoliated graphite or graphite worms, chemically etched or expanded soft carbon, chemically etched or expanded hard carbon, exfoliated activated carbon, chemically etched or expanded carbon black, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-graphene planar separation no less than 0.4 nm, chemically expanded carbon nano-fiber, chemically activated carbon nano-tube, chemically treated carbon fiber, chemically activated graphite fiber, chemically activated carbonized polymer fiber, chemically treated coke, meso-phase carbon, meso-porous carbon, or a combination thereof. The expanded spacing is preferably greater than 0.5 nm and/or the meso-porous structure preferably has a specific surface area greater than 100 m$^2$/g.

In particular, the meso-porous structure may be made from a graphene material selected from a single-layer sheet or multi-layer platelet of graphene, graphene oxide, fluorinated graphene, halogenated graphene, hydrogenated graphene, nitrogenated graphene, pristine graphene, doped graphene, boron doped graphene, nitrogen doped graphene, chemically treated graphene, reduced graphene oxide, functionalized graphene, functionalized graphene oxide, or a combination thereof, and wherein this graphene material alone or in combination with at least another material forms a meso-porous structure having a pore size from 2 nm to 50 nm (more preferably in the range of 5 to 10 nm).

In another preferred embodiment, the meso-porous structure is a porous, electrically conductive material selected from metal foam, carbon-coated metal foam, graphene-coated metal foam, metal web or screen, carbon-coated metal web or screen, graphene-coated metal web or screen, perforated metal sheet, carbon-coated porous metal sheet, graphene-coated porous metal sheet, metal fiber mat, carbon-coated metal-fiber mat, graphene-coated metal-fiber mat, metal nanowire mat, carbon-coated metal nanowire mat, graphene-coated metal nano-wire mat, surface-passivated porous metal, porous conductive polymer film, conductive polymer nano-fiber mat or paper, conductive polymer foam, carbon foam, carbon aerogel, carbon xerox gel, graphene foam, graphene oxide foam, reduced graphene oxide foam, or a combination thereof.

The meso-porous structure has a specific surface area preferably greater than 100 m$^2$/g, more preferably greater than 500 m$^2$/g, and most preferably greater than 1,000 m$^2$/g.

The lithium storage material may be selected from: (a) silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), iron (Fe), cadmium (Cd), or a mixture thereof; (b) alloy or intermetallic compound of Si, Ge, Sn, Pb, Sb, Bi, Zn, Al, Ti, Fe, Co, Ni, Mn, Cd, or a mixture thereof; (c) oxide, carbide, nitride, sulfide, phosphide, selenide, telluride, or antimonide of Si, Ge, Sn, Pb, Sb, Bi, Zn, Al, Fe, Ti, Co, Ni, Mn, Cd, or a mixture or composite thereof, (d) salt or hydroxide of Sn; or (e) a carbon or graphite material.

The phthalocyanine compound may be lodged in a pore or a plurality of pores of the meso-porous structure to form a hybrid structure having an electrical conductivity no less than $10^{-2}$ S/cm, preferably greater than 1 S/cm.

Preferably, the phthalocyanine compound is lodged in a pore or a plurality of pores of the meso-porous structure and the resulting hybrid structure (phthalocyanine and supporting material combined) preferably has a specific surface area greater than 50 m$^2$/g, more preferably greater than 100 m$^2$/g, and most preferably greater than 200 m$^2$/g. It is advantageous to have phthalocyanine compound lodging in a pore or a plurality of pores with the phthalocyanine compound forming a thin coating on the pore wall having a coating thickness smaller than 40 nm, more preferably <20 nm, and most preferably <10 nm.

The prelithiated lithium storage material may be selected from: (a) a pre-lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), iron (Fe), cadmium (Cd), or a mixture thereof; (b) a pre-lithiated alloy or intermetallic compound of Si, Ge, Sn, Pb, Sb, Bi, Zn, Al, Ti, Fe, Co, Ni, Mn, Cd, or a mixture thereof; (c) a pre-lithiated oxide, carbide, nitride, sulfide, phosphide, selenide, telluride, or antimonide of Si, Ge, Sn, Pb, Sb, Bi, Zn, Al, Fe, Ti, Co, Ni, Mn, Cd, or a mixture or composite thereof, (d) a pre-lithiated salt or hydroxide of Sn; or (e) a pre-lithiated carbon or graphite material.

The lithium storage material may be selected from graphite worms, exfoliated graphite flakes, expanded graphite, chemically treated graphite with an inter-graphene planar separation no less than 0.4 nm, chemically etched or expanded soft carbon, chemically etched or expanded hard carbon, exfoliated activated carbon, chemically etched or expanded carbon black, chemically expanded multi-walled carbon nano-tube, chemically expanded carbon nano-fiber, or a combination thereof, wherein this lithium storage material has surface areas to capture and store lithium thereon and has a specific surface area greater than 50 m$^2$/g in direct contact with said electrolyte.

The hybrid cathode active material may further comprise a carbon material coated on or in contact with a particle of the phthalocyanine compound and wherein the carbon material is selected from carbonized resin, amorphous carbon, chemical vapor deposition carbon, carbon black, acetylene black, activated carbon, fine expanded graphite particle with a dimension smaller than 100 nm, artificial graphite particle, natural graphite particle, or a combination thereof.

The prelithiated lithium storage material may advantageously contain a mixture of a high capacity anode material and a high rate capable anode material, wherein said high rate capable anode material is selected from nano-scaled particles or filaments of a lithium transition metal oxide, lithiated $Co_3O_4$, lithiated $Mn_3O_4$, lithiated $Fe_3O_4$, $Li_4Ti_5O_{12}$, or a combination thereof, and said high capacity anode material is selected from pre-lithiated Si, Ge, Sn, SnO, or a combination thereof. The prelithiated lithium storage material preferably has a specific capacity of no less than 500 mAh/g based on the anode active material weight, more preferably and typically no less than 1000 mAh/g, and further preferably no less than 2,000 mAh/g.

The electrolyte is preferably organic liquid electrolyte, ionic liquid electrolyte, polymer electrolyte, gel electrolyte, or a combination thereof. The electrolyte typically contains a first amount of lithium ions when the cell is made. The electrolyte preferably comprises lithium salt-containing liquid electrolyte (e.g. organic liquid or ionic liquid) or gel electrolyte in which lithium ions have a high diffusion coefficient. Solid electrolyte is normally not desirable, but some thin layer of solid electrolyte may be used if it exhibits a relatively high diffusion rate. Lithium-containing ionic liquids are particularly desired due to their low volatility and non-flammability (hence, low or no fire or explosion hazard).

BRIEF DESCRIPTION OF THE DRAWINGS

FIG. 1 (A) The cathode specific capacity data (based on the cathode active material weight only) as listed in Table 1 of Yamaki, et al (1982) are plotted as a function of the proportion of the active material (=H2Pc/(H2Pc+AB); (B) The same data were re-calculated based on the H2Pc and AB weights combined, which are more realistic.

DESCRIPTION OF THE PREFERRED EMBODIMENTS

Figure 2A:
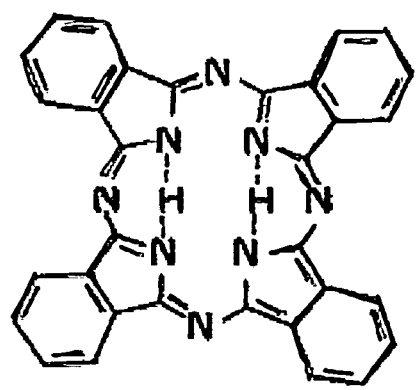
FIG. 2 (A) Chemical formula of H2Pc (as an example of metal-free phthalocyanine); (B) Chemical formula of FePc (as an example of metal phthalocyanine).
Figure 2B:
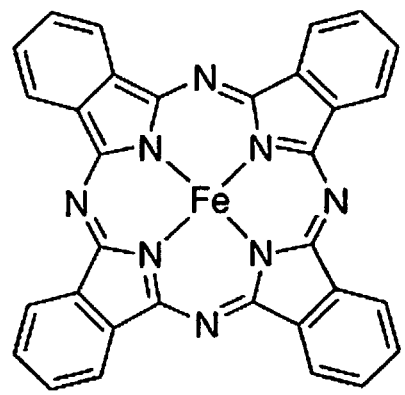

The present invention may be more readily understood by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting the claimed invention.

The present invention provides a new and distinct type of rechargeable lithium metal or lithium-ion cell, which exhibits the highest energy density of all rechargeable lithium-ion batteries ever reported in battery industry. This new lithium metal or lithium-ion cell features an ultra-high capacity cathode having an ability to store lithium ions up to a specific capacity of 2,200 mAh/g, which is 8 times higher than the best capacity (250 mAh/g) of conventional Li-ion battery cathode materials. When combined with an anode active material with an ultra-high capacity anode (e.g. Li metal or prelithiated silicon), this cathode enables the lithium-ion cell to store a cell-level energy density of up to 400-650 Wh/kg, in contrast to the typical 150-200 Wh/kg of conventional Li-ion cells. These experimental values are shocking and completely beyond and above the expectations of even the most skilled workers in the art of electrochemistry or batteries.

The presently invented rechargeable lithium cell (including lithium metal secondary cell and lithium-ion secondary cell) is preferably composed of (a) an anode comprising an anode active material, wherein the anode active material is a prelithiated lithium storage material or a combination of a lithium storage material and a lithium ion source selected from lithium metal, lithium alloy, or lithium-containing compound; (b) a cathode comprising a hybrid cathode active material composed of a conductive material-based meso-porous structure and a phthalocyanine compound, wherein the meso-porous structure is in an amount of from 1% to 99% by weight based on the total weight of the meso-porous structure and the phthalocyanine compound combined (phthalocyanine compound in the amount of 1% to 99%); and (c) a porous separator disposed between the anode and the cathode and electrolyte in ionic contact with the anode and the cathode. Preferably, the meso-porous structure is in an amount of from 5% to 50% by weight and, more preferably, from 10% to 30% by weight. The meso-porous structure is preferably made from a conductive material, such as carbon, graphite, conductive polymer, and metal.

This is essentially a lithium-ion cell if the anode active material is a pre-lithiated lithium storage material, such as silicon (Si). Alternatively, the anode is composed of an anode current collector and a lithium ion source selected from lithium metal, lithium ion, or lithium-containing compound. The only anode active material is this lithium ion source. This is essentially a type of rechargeable lithium metal cell.

It is important to state from the outset that the meso-porous structure having a pore size of 2-50 nm (most preferably 5-10 nm) is not an arbitrarily selected pore size range. This is selected based on our experimental observations (after an extensive and in-depth study) summarized below:

(1) It was difficult to impregnate a phthalocyanine compound into pores of a conductive structure if the pore size is less than 2 nm in size. It was practically impossible to impregnate a pore smaller than 1 nm.

(2) There has been little or no dissolution of a phthalocyanine compound in the liquid electrolyte used in the rechargeable cell if most of the pore sizes are in the range of 2-50 nm and there has been no dissolution or weight loss of a phthalocyanine compound if the pore size is less than 10 nm. This leads to minimal capacity decay of the cell upon repeated charges/discharges for a large number of cycles.

(3) It is most easy to impregnate pores larger than 5 nm.

(4) It is undesirable to have too many pores larger than 100 nm because these large pore sizes imply a lower cathode tap density (lower amount of cathode active material packed into a unit volume of the cathode material). A pore size of <50 nm is preferred and <20 nm is further preferred.

The phthalocyanine compound may be selected from a metal phthalocyanine compound (such as copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, or silver phthalocyanine), or a metal-free phthalocyanine (e.g. hydrogen phthalocyanine), a chemical derivative of a metal or metal-free phthalocyanine, or a combination thereof. This group of material has a distinct characteristic that it is a planar, aromatic molecule that has a high theoretical lithium storage capacity, but extremely low electrical and thermal conductivities.

For use in the presently invented cell, transition metal phthalocyanine compounds, such as iron phthalocyanine (FePc), nickel phthalocyanine (NiPc), manganous phthalocyanine (MnPc), and cobalt phthalocyanine, are particularly desirable due to their high lithium storage capacities and the high cell voltages when they pair up with selected anode active materials. They are also found to be chemically compatible with a wide array of conductive materials, such as carbon, graphite, conductive polymer, and carbon/graphite-coated metal.

The following types of porous structures are found to be particularly suitable for use to support and protect the phthalocyanine compound: a porous sheet, paper, web, film, fabric, non-woven, mat, aggregate, or foam of a carbon or graphite material that has been expanded, activated, chemically treated, exfoliated, and/or isolated (isolation means the graphene planes that constitute a carbon crystal have been separated and isolated from one another to form graphene sheets). This porous structure can contain graphene, graphene oxide, reduced graphene oxide, graphene fluoride, doped graphene, functionalized graphene, expanded graphite with an inter-graphene spacing greater than 0.4 nm, exfoliated graphite, chemically etched or expanded soft carbon, chemically etched or expanded hard carbon, exfoliated activated carbon, chemically etched or expanded carbon black, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-graphene planar separation no less than 0.4 nm, chemically expanded carbon nano-fiber, chemically activated or expanded carbon nano-tube, carbon fiber, graphite fiber, carbonized polymer fiber, coke, meso-phase carbon, or a combination thereof. The expanded spacing is preferably >0.5 nm, more preferably >0.6 nm, and most preferably >0.8 nm.

Alternatively, the meso-porous structure may contain a porous, electrically conductive material selected from metal foam, carbon-coated metal foam, graphene-coated metal foam, metal web or screen, carbon-coated metal web or screen, graphene-coated metal web or screen, perforated metal sheet, carbon-coated porous metal sheet, graphene-coated porous metal sheet, metal fiber mat, carbon-coated metal-fiber mat, graphene-coated metal-fiber mat, metal nanowire mat, carbon-coated metal nanowire mat, graphene-coated metal nano-wire mat, surface-passivated porous metal, porous conductive polymer film, conductive polymer nano-fiber mat or paper, conductive polymer foam, carbon foam, carbon aerogel, carbon xerox gel, graphene foam, graphene oxide foam, reduced graphene oxide foam, or a combination thereof. These porous and electrically conductive materials are capable of accommodating phthalocyanine compound in their pores and, in many cases, capable of protecting the phthalocyanine compound from getting dissolved in a liquid electrolyte, in addition to providing a 3-D network of electron-conducting paths.

Conductive polymer nano-fiber mats can be readily produced by electro-spinning of a conductive polymer, which can be an intrinsically conductive (conjugate-chain) polymer or a conductive filler-filled polymer. Electro-spinning is well-known in the art. The production of carbon foam, carbon aerogel, or carbon Xerox gel is also well-known in the art.

Particularly useful metal foams include copper foam, stainless steel foam, nickel foam, titanium foam, and aluminum foam. The fabrication of metal foams is well known in the art and a wide variety of metal foams are commercially available. Preferably, the surfaces of metallic foams are coated with a thin layer of carbon or graphene because carbon and graphene are more electrochemically inert and will not get dissolved during the charge/discharge cycles of the cell. Hence, carbon-coated metal foam, graphene-coated metal foam, carbon-coated metal web or screen, graphene-coated metal web or screen, carbon-coated porous metal sheet, graphene-coated porous metal sheet, carbon-coated metal-fiber mat, graphene-coated metal-fiber mat, carbon-coated metal nanowire mat, and graphene-coated metal nano-wire mat are preferred current collector materials for use in the rechargeable lithium cell. Also particularly useful are carbon foam, carbon aerogel, carbon xerox gel, graphene foam, graphene oxide foam, and reduced graphene oxide foam. These foams may be reinforced with a binder resin, conductive polymer, or CNTs to make a current collector of good structural integrity.

In one preferred embodiment, highly porous graphitic or carbonaceous materials may be used to make a conductive and protective backbone structure prior to impregnating the resulting porous structure with a phthalocyanine compound. In this approach, particles of these materials may be bonded by a binder to form a porous structure of good structural integrity. Impregnation of the pores with a phthalocyanine compound can then be accomplished through melt immersion or infiltration, physical vapor infiltration, chemical vapor infiltration, solution dipping and impregnation, etc.

In another possible route, porous graphitic or carbonaceous material particles, along with a resin binder, may be coated onto surfaces of a highly porous metal framework with large pores, such as a metal foam, web, or screen, which serves as a backbone for a meso-porous structure. The combined hybrid structure is preferably very porous with a specific surface area significantly greater than 100 m$^2$/g. Impregnation of the pores with a phthalocyanine compound can then be accomplished through melt immersion or infiltration, physical vapor infiltration, chemical vapor infiltration, solution dipping and impregnation, etc.

In yet another possible route, a phthalocyanine compound may be made into a fine powder form. Particles of the phthalocyanine compound and particles of a porous graphitic or carbonaceous material, along with an optional resin binder, are then mixed and bonded to a layer of cathode current collector.

Figure 3:
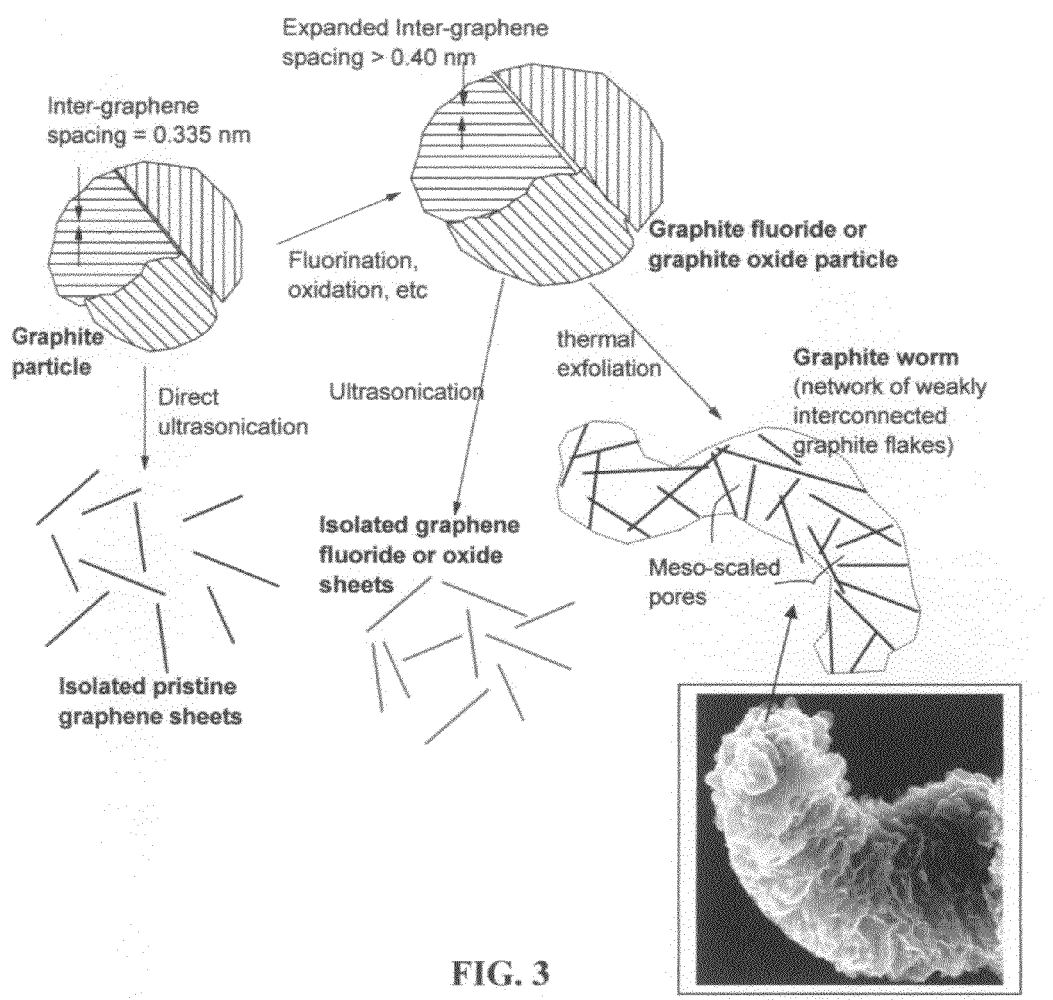
FIG. 3 Schematic of selected procedures for producing pristine graphene sheets, graphite oxide or graphite fluoride (with an expanded inter-graphene spacing), and exfoliated graphite (graphite worms) from natural or artificial graphite.

More desirable porous graphitic or carbonaceous materials for practicing the instant invention are further described below:

As schematically illustrated in FIG. 3, a natural or artificial graphite particle is typically composed of several graphite crystal grains or crystallites (3 being shown) with each crystallite made up of multiple graphene planes bonded via van der Waals forces in the c-direction (a direction perpendicular to the graphene plane). The inter-graphene plane spacing, $d_{002}$ as measured by X-ray diffraction, is typically from 0.335 nm (natural graphite) to 0.337 (artificial graphite). Graphite particles, without any chemical intercalation, oxidation, fluorination, etc, can be dispersed in water containing a surfactant and the resulting suspension subjected to high-power ultrasonic wave treatment to produce pristine graphene, a process commonly referred to as direct ultrasonication or liquid phase production. The resulting pristine graphene sheets are relatively defect-free and exhibit exceptional thermal conductivity and electric conductivity.

Figure 4A:
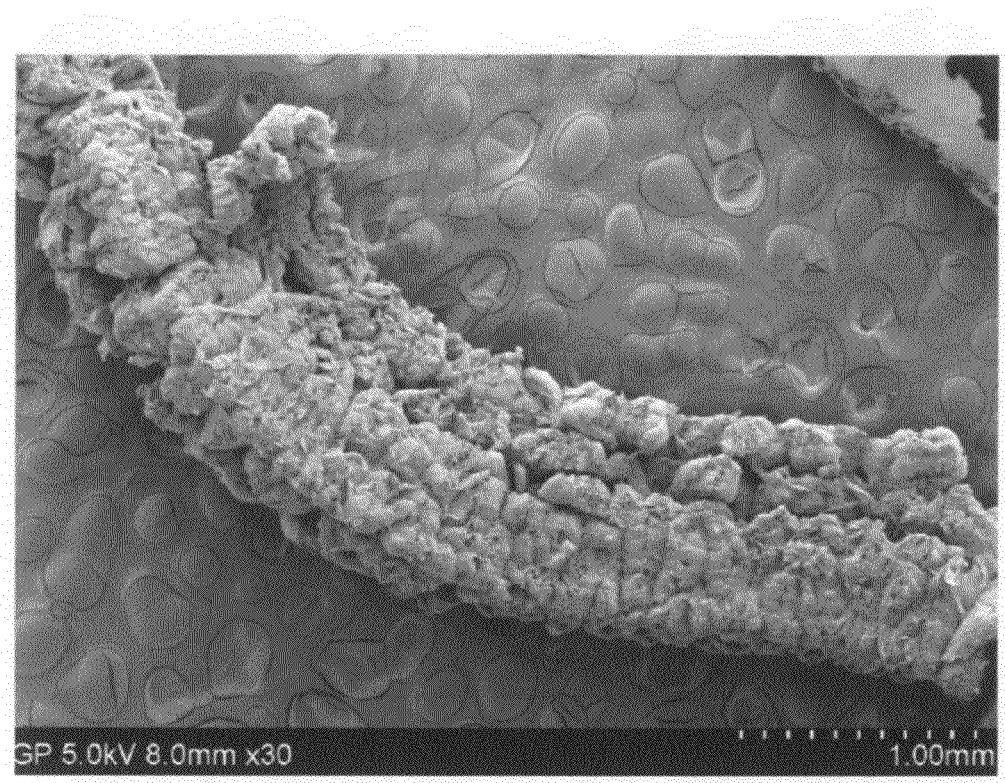
FIG. 4 SEM images of (A) a graphite worm; (B) another graphite worm taken at a higher magnification; (C) a meso-porous graphitic structure prepared by exfoliating a soft carbon; (D) a meso-porous graphitic structure prepared by chemically etching or expanding a hard carbon material; (E) an expanded MCMB; (F) expanded carbon fibers; and (G) a meso-porous structure made of graphene sheets re-constituted into an approximately spherical shape.
Figure 4B:
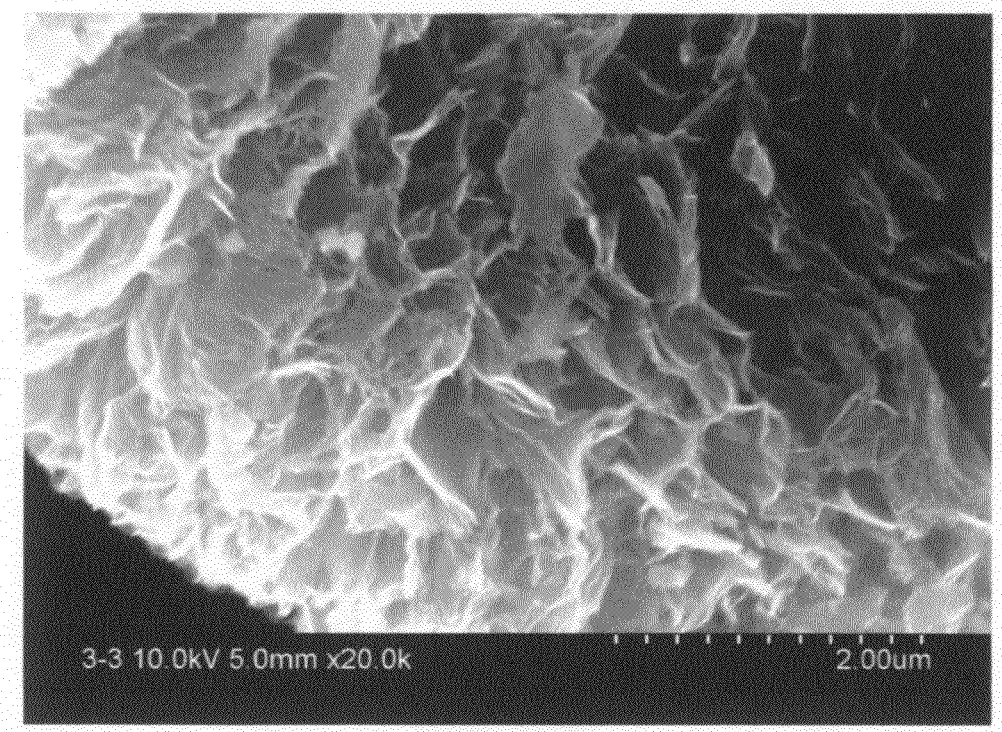
Figure 4C:
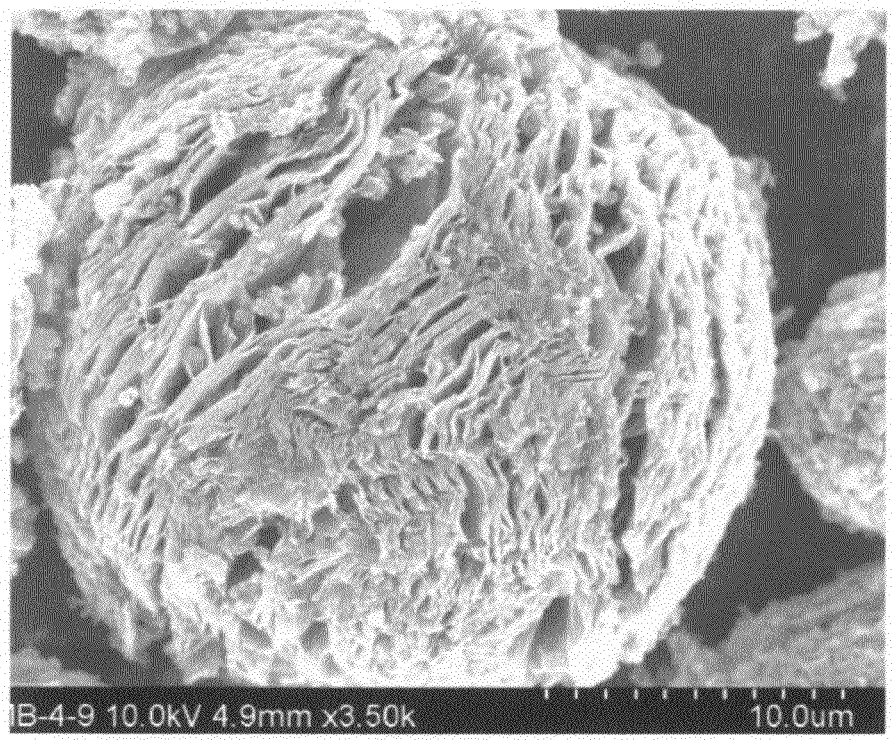
Figure 4D:
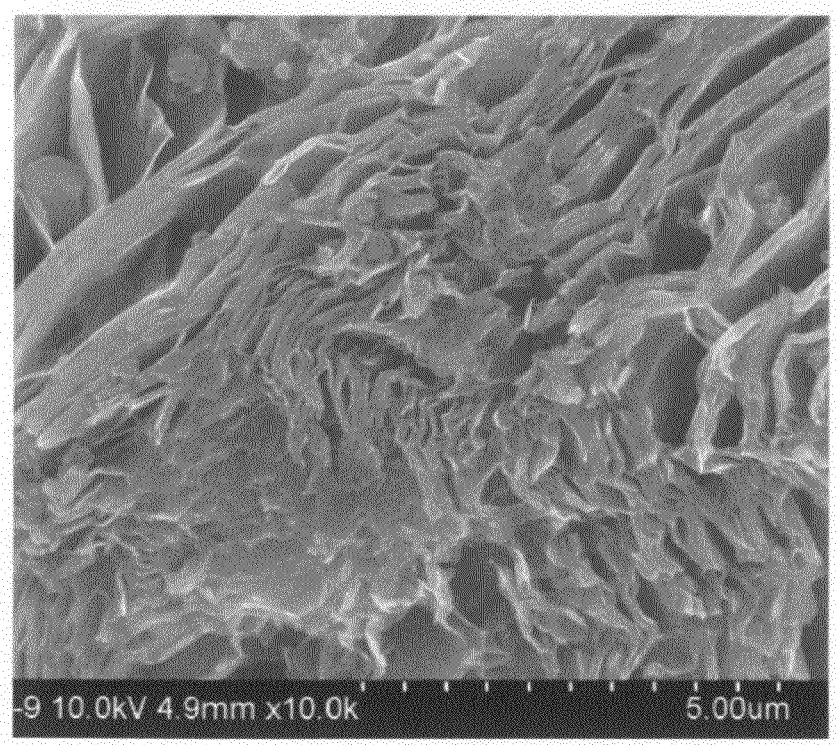
Figure 4E:
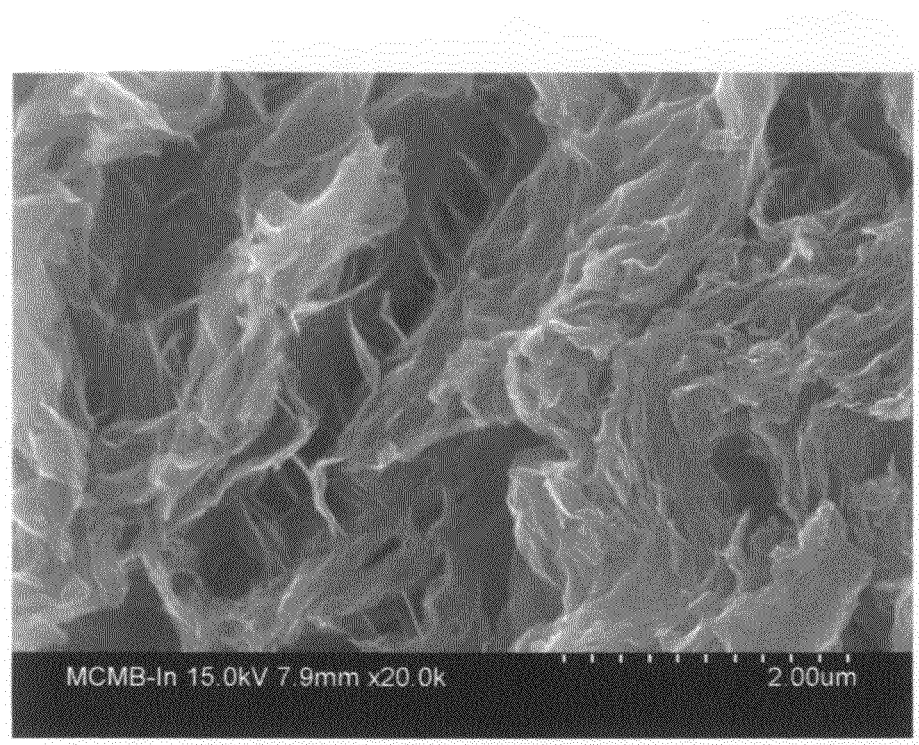
Figure 4F:
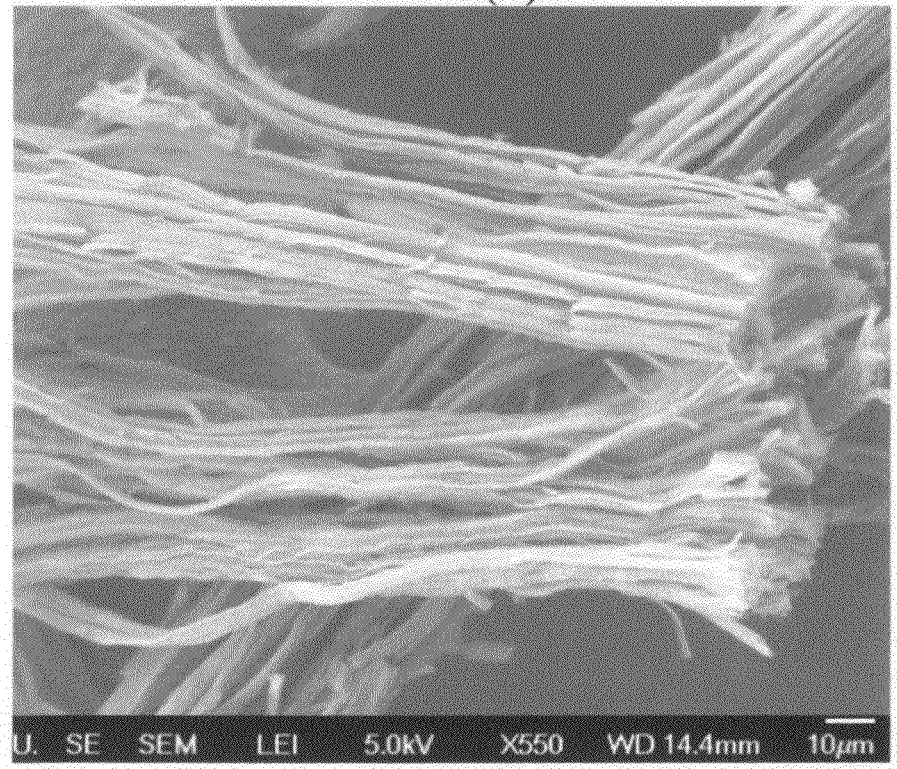
Figure 4G:
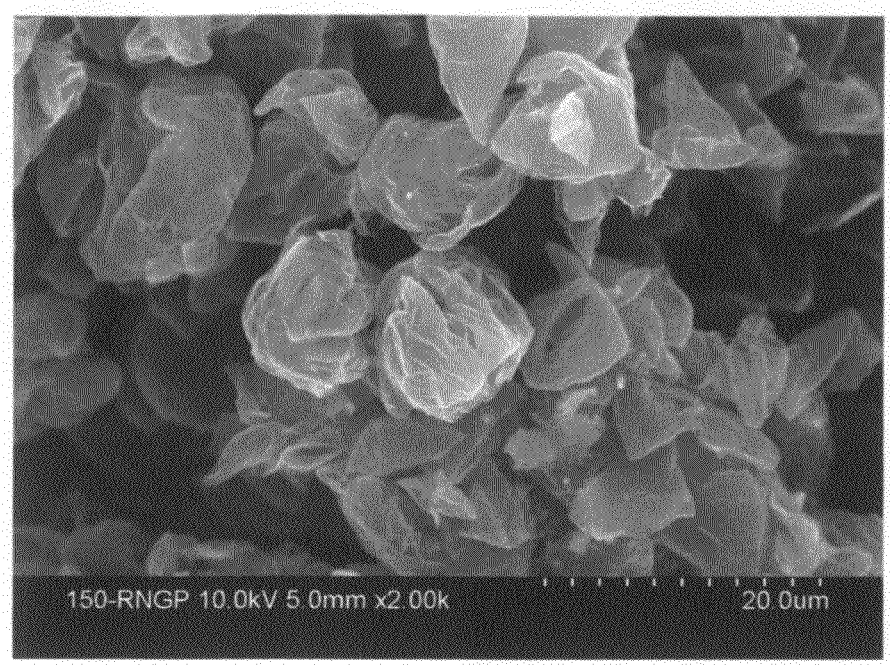
Figure 5:
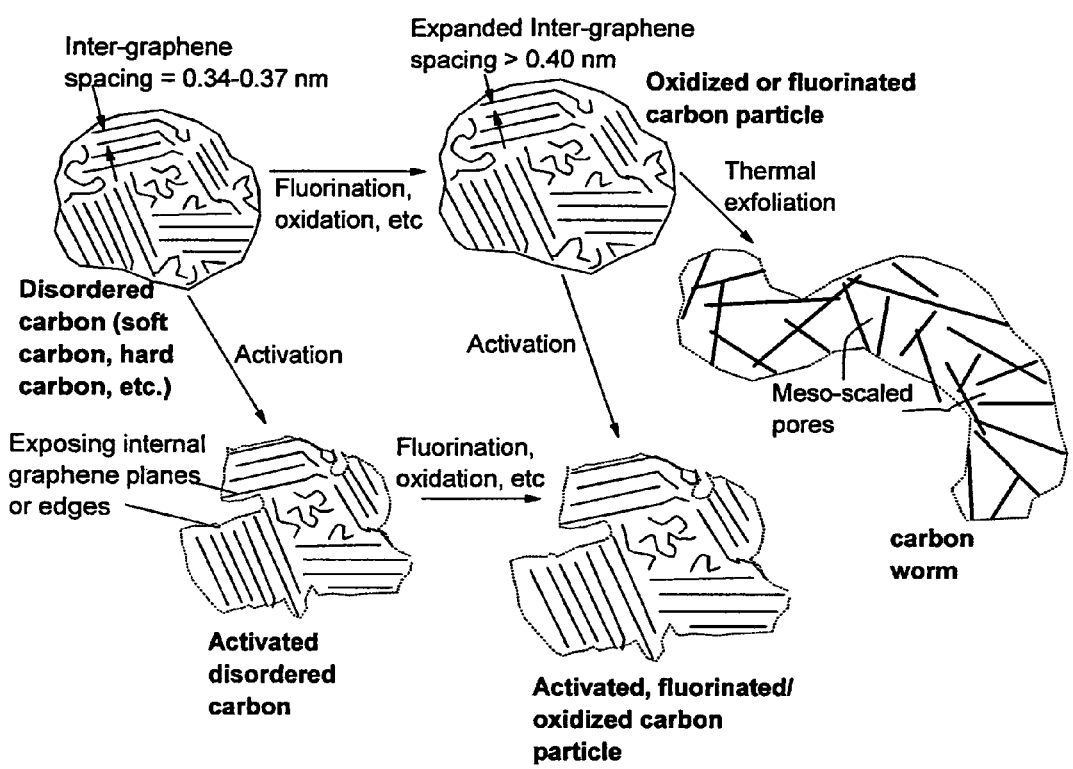
FIG. 5 Schematic of selected procedures for producing activated disordered carbon, oxidized or fluorinated carbon (with an expanded inter-graphene spacing), exfoliated carbon (carbon worms), and activated/expanded carbon from disordered carbon.
Figure 6:
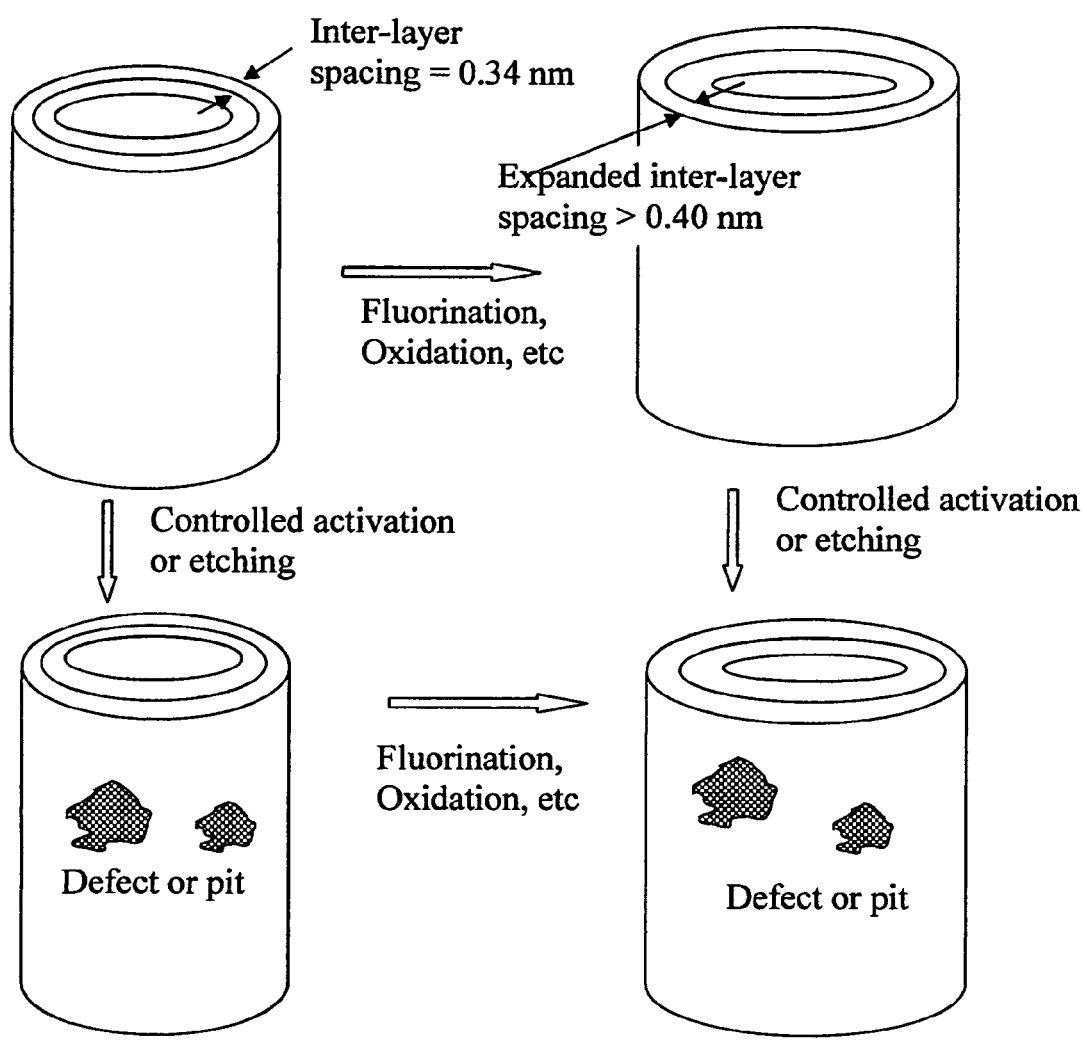
FIG. 6 Schematic of selected procedures for producing activated carbon nanotubes, oxidized or fluorinated CNTs with an expanded inter-graphene spacing, and activated/expanded CNTs from multi-walled CNTs.

Alternatively, as illustrated in the upper-right portion of FIG. 3, graphite particles may be subjected to an oxidation treatment, fluorination treatment (or other types of halogenation or chemical expansion treatments), or intercalation (e.g. in a mixture of sulfuric acid and nitric acid) to produce graphite oxide (GO), graphite fluoride (GF), or graphite intercalation compound (GIC). The GO, GF, or GIC may be subsequently subjected to an ultrasonication treatment to exfoliate/separate graphene planes, forming isolated (separated) graphene oxide or graphene fluoride sheets. Alternatively, the GO, GF, or GIC may be subsequently subjected to a thermal exfoliation treatment (typically in a temperature of 150-1200° C., more typically 650-1050° C.) to obtain exfoliated graphite (or graphite worms). A graphite worm is a worm-like, highly porous structure composed of networks of weakly interconnected graphite flakes and/or graphene sheets. Two SEM images of graphite worms are presented in FIGS. 4(A) and (B).

A mass of graphite worms may be roll-pressed to obtain a flexible graphite sheet, which may be used as a solid (relatively non-porous) current collector in a conventional lithium-ion battery. However, such a prior art flexible graphite sheet is relatively pore-free on the sheet surface and could not be penetrated by liquid electrolyte. Further, the constituent graphite flakes are compressed and re-stacked together and, hence, are not accessible by liquid electrolyte. The flexible graphite sheet is not meso-porous, and the specific surface area of the conventional flexible graphite sheet is typically much <10 m$^2$/g. Furthermore, the flexible graphite sheet itself has a very low lithium storage capability (typically <<100 mAh/g) and, hence, has not been considered a suitable lithium storage material.

By contrast, we have found a way to preserve the porous characteristics of graphite worms. Without breaking up the links between constituent graphite flakes of a worm, graphite worms may be lightly impregnated with a binder resin, which is cured or solidified to impart structural integrity to the worms (which are otherwise very fluffy and weak). The curing or solidifying procedure may be conducted while the graphite worm mass is under a light and controlled pressure. The resulting mass is an integral sheet of porous graphite worm foam with a high specific surface area (typically >100 m$^2$/g and more typically >200 m$^2$/g). The resin binder may be optionally carbonized to further increase the conductivity of the graphite worm foam and its ability to capture metal ions on graphite flake surfaces.

Graphite worms, as exfoliated (without a binder), may be optionally subjected to mechanical shearing (e.g. air-jet milling) to produce graphite flakes. These flakes would have a thickness >100 nm, if the original graphite has received insufficient oxidation, fluorination, or intercalation treatment prior to the thermal exfoliation step. These flakes can become nano graphene platelets (NGPs) with a thickness <100 nm and more typically <10 nm (including multi-layer graphene platelets or single-layer graphene sheets, as thin as 0.34 nm) if the original graphite has been heavily oxidized, fluorinated, or intercalated. The graphite worms or the isolated graphene platelets/sheets (NGPs) may be further subjected to a chemical activation or etching treatment to generate more defects or pores therein or thereon. A plurality of NGPs may be re-constituted into various porous structures or morphologies (e.g. porous graphene sphere, curved graphene sheets, wrinkled graphene, etc) having a pore size in the range of 2 to 50 nm when they are aggregated and bonded together. The resulting porous structure having a high specific surface area makes a good current collector, which is also capable of storing large amounts of metal on graphene surfaces.

In particular, the meso-porous structure to support the phthalocyanine compound in the cathode of the presently invented lithium cell is preferably made from a graphene material selected from a single-layer sheet or multi-layer platelet of graphene, graphene oxide, graphene fluoride, hydrogenated graphene, nitrogenated graphene, pristine graphene, doped graphene, boron doped graphene, nitrogen doped graphene, chemically treated graphene, reduced graphene oxide, functionalized graphene or graphene oxide, or a combination thereof. In the present application, nano graphene platelets (NGPs) or "graphene materials" collectively refer to single-layer and multi-layer versions of graphene, graphene oxide, graphene fluoride, hydrogenated graphene, nitrogenated graphene, doped graphene, etc.

The thickness of an NGP is no greater than 100 nm and, in the present application, no greater than 10 nm (preferably no greater than 5 nm). The NGP is preferably single-layer graphene or few-layer graphene (less than 10 graphene planes). In the presently defined NGPs, there is no limitation on the length and width, but they are preferably smaller than 10 μm and more preferably smaller than 1 μm. We have been able to produce NGPs with length smaller than 100 nm or larger than 10 μm. The NGP can be pristine graphene (with essentially 0% oxygen content) or graphene oxide (typically from 10 up to approximately 45% by weight oxygen). Graphene oxide can be thermally or chemically reduced to become reduced graphene oxide (typically with an oxygen content of 1-10%, mostly below 5% by weight). For use in the cathode of the lithium-ion cell, the oxygen content is preferably in the range of 0% to 10% by weight, and more preferably in the range of 0% to 5% by weight. The specific surface area accessible to liquid electrolyte is the single most important parameter in dictating the energy and power densities of a lithium-ion cell of the present invention. Thus, it is highly desirable to pack multiple graphene sheets into a meso-porous structure having a pore size of 2-50 nm, more preferably 5-20 nm.

Despite the fact that individual graphene sheets have an exceptionally high specific surface area, flat-shaped graphene sheets prepared by conventional routes have a great tendency to re-stack together or overlap with one another, thereby dramatically reducing the specific surface area that is accessible by the electrolyte. We have developed a new breed of graphene, herein referred to as the curved graphene platelet or sheet. Curved NGPs are capable of forming a meso-porous structure having a desired pore size range (e.g. slightly >2 nm) when they were stacked together to form an electrode. This size range appears to be conducive to being accessible by the commonly used lithium-containing electrolytes.

The curved NGPs may be produced by using the following recommended procedures:
(a) dispersing or immersing a laminar graphite material (e.g., natural graphite powder) in a mixture of an intercalant and an oxidant (e.g., concentrated sulfuric acid and nitric acid, respectively) to obtain a graphite intercalation compound (GIC) or graphite oxide (GO);
(b) exposing the resulting GIC or GO to a thermal shock, preferably in a temperature range of 600-1,100° C. for a short period of time (typically 15 to 60 seconds), to obtain exfoliated graphite or graphite worms (some oxidized NGPs with a thickness <100 nm could be formed at this stage if the intercalation/oxidation step was allowed to proceed for a sufficiently long duration of time; e.g. >24 hours);
(c) dispersing the exfoliated graphite to a liquid medium to obtain a graphene-liquid suspension (a functionalizing agent may be added into this suspension if functional groups are desired, as in our co-pending application);
(d) aerosolizing the graphene-liquid suspension into liquid droplets while concurrently removing the liquid to recover curved NGPs. Without the aerosolizing step, the resulting graphene platelets tend to be flat-shaped.

It may be noted that steps (a) to (b) are the most commonly used steps to obtain exfoliated graphite and graphene oxide platelets in the field. Step (d) is essential to the production of curved graphene sheets. Oxidized NGPs or GO platelets may be chemically reduced to recover conductivity properties using hydrazine as a reducing agent, before, during, or after chemical functionalization.

In 2007, we reported a direct ultrasonication method of producing pristine nano graphene directly from graphite particles dispersed in a surfactant-water suspension [A. Zhamu, et al, "Method of Producing Exfoliated Graphite, Flexible Graphite, and Nano-Scaled Graphene Plates," U.S. patent application Ser. No. 11/800,728 (May 8, 2007)]. This method entails dispersing natural graphite particles in a low surface tension liquid, such as acetone or hexane. The resulting suspension is then subjected to direct ultrasonication for 10-120 minutes, which produces graphene at a rate equivalent to 20,000 attempts to peel off graphene sheets per second per particle. The graphite has never been intercalated or oxidized and, hence, requires no subsequent chemical reduction. This method is fast, environmentally benign, and can be readily scaled up, paving the way to the mass production of pristine nano graphene materials. The same method was later studied by others and now more commonly referred to as the "liquid phase production."

When a multi-layer graphene platelet is present in the cathode of the presently invented lithium-ion cell, the discharge operation of the cell can involve intercalating lithium into an inter-graphene space in a multi-layer graphene platelet and capturing and storing lithium on surfaces of a single-layer graphene sheet (if present) or multi-layer graphene platelet.

Nitrogenated graphene, nitrogen-doped graphene, or boron-doped graphene can be produced from chemical synthesis, chemical vapor deposition (CVD), or ion implantation. For instance, nitrogen-doped graphene can be produced from CVD using $CH_4$ as a carbon source, $NH_3$ as a nitrogen source, nano-scaled Cu/Ni particles (or Cu, Ni, or Cu/Ni, foil) as a catalyst. Boron-doped graphene can be produced by boron ion implantation.

The approach used to combine a phthalocyanine compound and a carbon or graphite material (e.g. graphene material or chemically treated soft carbon) to form a hybrid cathode active material has a truly unexpected and profound impact on the chemical composition, microstructure, morphology, and properties of the resulting hybrid material. All of the porous carbon/graphite material particles can be packed, along with a resin binder, into a meso-porous structure. Metal foams are already a highly porous structure, and mats of electro-spun conductive nano-fibers are also porous. The phthalocyanine compound, alone or in a blend with a desired amount of fine carbon particles, can then be infiltrated into pores of the meso-porous structure.

Alternatively, the porous carbon or graphite material may be initially in a fine powder form, prior to being packed into a meso-porous structure. In this case, the formation of a meso-porous structure may be allowed to occur concurrently with the mixing of a phthalocyanine compound. These are further discussed in several examples toward the end of this specification.

Approaches that can be used for combining a porous conductive material and a phthalocyanine compound include, but are not limited to, the following:
(1) Dry powder mixing: Most of the phthalocyanine compounds are available in a powder form, so are all graphene materials and some porous carbon or graphite materials. The most straightforward way of mixing these two dry powder ingredients is through a wide variety of drying powder mixing processes (e.g. tumbling mixing, air jet mixing, and mixture grinding). However, the resulting mixtures, when used as a cathode active material for a rechargeable lithium metal or lithium-ion cell, deliver the worst performance as compared to those prepared by other methods discussed below.

(2) High-intensity ball-milling: The phthalocyanine compound powder and porous carbon/graphite material powder may be mixed to form a powder mixture, which is then subjected to ball-milling. Ball milling may be preceded by a dry mixing procedure.

(3) Co-precipitation: A solution or suspension of a phthalocyanine compound and a solution or suspension of a graphene material in a common solvent or dispersing liquid medium may be mixed to form a solution or suspension. The solvent or liquid is then removed to enable co-precipitation of the phthalocyanine compound and the graphene material to form an intimately mixed and interacted hybrid material. After an extensive and in-depth study, we have observed that various graphene materials are effective heterogeneous nucleating agents for phthalocyanine compounds and the 2-D nano geometric nature also acts to constraint the growth of phthalocyanine compound crystals in both thickness and lateral dimensions. We have also observed that the phthalocyanine compound and the graphene material have a great natural affinity to develop $\pi$-$\pi$ interactions, providing effective charge transfer during the charge and discharge of a lithium cell. This seems to have played a critical role in reducing the solubility of phthalocyanine in the electrolyte or reducing the catalytic effect of phthalocyanine in decomposing the electrolyte. These are yet another two unexpected effects.

(4) Vapor-phase deposition of phthalocyanine compound molecules on graphene material surfaces or exfoliated graphite flake surfaces: Most of the phthalocyanine compounds can be vaporized or sublimed at a temperature in the range of 250-700° C.

(5) Melt mixing: One can disperse graphene sheets in a phthalocyanine compound melt in a protective atmosphere to form a composite fluid, which is then extruded and pelletized.

Alternatively and advantageously, multiple graphene sheets can be combined into individual secondary particles that are highly porous (preferably having a pore size in the range of 1-100 nm, more preferably 2-50 nm, and most preferably 5-20 nm). These secondary particles, typically 1-20 µm in size, are then packed and bonded with a binder to form a meso-porous backbone structure having pores to accommodate. The pores (preferably 2-50 nm in size) of this meso-porous backbone structure is then impregnated with a phthalocyanine compound through melt infiltration, vapor phase infiltration, liquid solution impregnation, etc.

In general, the cathode active material (including the porous backbone structure and the phthalocyanine compound lodged in the pores) as a whole also preferably form a meso-porous structure with a desired amount of meso-scaled pores (2-50 nm, preferably 2-10 nm) to allow the entry of electrolyte. This is advantageous because these pores enable a great amount of surface areas to be in physical contact with electrolyte and capable of capturing lithium from the electrolyte. These surface areas of the cathode active material as a whole are typically and preferably >50 $m^2/g$, more preferably >500 $m^2/g$, further more preferably >1,000 $m^2/g$, and most preferably >1,500 $m^2/g$.

The presently invented cell also contains a negative electrode (anode) comprising an anode active material for inserting and extracting lithium during the charge and discharge of the cell, wherein the anode active material is mixed with a conductive additive and/or a resin binder to form a porous electrode structure, or coated onto a current collector in a coating or thin film form (e.g. film thickness <100 µm). The anode active material preferably has a lithium storage capacity greater than 400 mAh/g (more preferably greater than 1,000 mAh/g, and most preferably greater than 2,000 mAh/g). The anode active material is preferably nano-scaled material having a dimension less than 100 nm, preferably less than 20 nm.

It may be noted that graphite crystals in a graphitic or carbonaceous material contain graphene planes having an inter-graphene plane spacing of approximately 0.34 nm. We have experimentally observed that, by oxidizing or fluorinating the graphite crystals one can increase the inter-graphene spacing to >0.40 nm, more typically >0.50 nm, and most typically >0.60 nm. We have further observed that these expanded graphite crystals with extra spaces between graphene planes can accommodate great amounts of lithium atoms when used as an anode active material.

This cell preferably contains a meso-porous graphitic or carbonaceous material-based anode containing active surfaces for capturing and storing lithium atoms thereon. The graphitic material may be selected from graphene sheets, graphite worms, exfoliated graphite flakes, expanded graphite, chemically treated graphite with an inter-graphene planar separation no less than 0.4 nm (preferably greater than 0.5 nm, more preferably greater than 0.6 nm, most preferably greater than 0.8 nm), soft carbon (preferably, chemically etched or expanded soft carbon), hard carbon (preferably, chemically etched or expanded hard carbon), activated carbon (preferably, exfoliated activated carbon), carbon black (preferably, chemically etched or expanded carbon black), chemically expanded multi-walled carbon nano-tube, chemically expanded carbon nano-fiber, or a combination thereof. The graphitic material optionally may also have the capability to store some lithium in the bulk (interior) of graphitic material particles.

The rechargeable Li cell further contains a porous separator disposed between the anode and the cathode; a lithium-containing electrolyte in physical contact with the two electrodes (the anode and the cathode); and a lithium source disposed in the anode (if the anode active material is not pre-lithiated) when the cell is made. In one preferred embodiment, the anode active material is not pre-lithiated and is lithium-free when the cell is made.

Several types of lithium sources may be implemented to provide the lithium ions that are needed for shuttling between the anode and the cathode. Examples of the sources are a lithium chip, lithium alloy chip, lithium foil, lithium alloy foil, lithium powder, lithium alloy powder, surface stabilized lithium particles, a mixture of lithium metal or lithium alloy with a lithium intercalation compound, lithium or lithium alloy film coated on a surface of an anode or cathode active material, or a combination thereof.

In this preferred embodiment of the present invention, the anode active material is not prelithiated since there is a lithium ion source already. In particular, the anode active material is a non-prelithiated material selected from the group consisting of: (a) Non-lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Non-lithiated alloys or intermetallic compounds of Si, Ge, Sn, Pb, Sb, Bi, Zn, Al, Ti, Co, Ni, Mn, Cd, and their mixtures; (c) Non-lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Non-lithiated salts or hydroxides of Sn; and (e) graphite or carbon material in a powder or fibrous form.

Unless the anode active material is directly coated onto a current collector, the anode active material is typically mixed with a conductive additive and/or a resin binder to form a porous electrode structure that is electrically connected to the anode current collector.

During the first discharge cycle of the cell after it is made, the lithium source releases lithium ions into the electrolyte. These lithium ions in the electrolyte migrate through the porous separator into the cathode and get captured by the cathode, via surface-capturing of Li (Li adsorbed on surfaces of phthalocyanine molecules or surfaces of graphene sheets) and Li intercalation (into inter-molecular spaces in a phthalocyanine compound crystal or inter-graphene spaces in a multi-layer graphene platelet).

During the subsequent re-charge of the cell, lithium ions are released from the cathode and migrate back to the anode side. These lithium ions then intercalate into the interior of anode active material particles or coating, or get captured by graphene surfaces when available. The subsequent discharge cycle involves releasing lithium ions from the anode active material through de-intercalation, de-sorption, or dissolution. In a preferred embodiment, the aforementioned non-lithiated anode active material is in the form of a nano particle, nano disc, nano platelet, nano wire, nano-rod, nano belt, nano scroll, nano tube, nano filament, nano coating, or nano film, having a dimension less than 100 nm, preferably less than 20 nm.

Preferably, the anode active material contains a mixture of a high capacity anode material and a high rate capable anode material, wherein the high rate capable anode material is selected from nano-scaled particles or filaments of a transition metal oxide, $Co_3O_4$, $Mn_3O_4$, $Fe_3O_4$, or a combination thereof, and the high capacity anode material is selected from Si, Ge, Sn, SnO, or a combination thereof. Nano-scaled particles or filaments have a dimension (e.g. diameter or thickness) less than 100 nm, enabling a short lithium diffusion time and high power density.

It has been commonly believed that a high specific surface area is an undesirable feature of either an anode or a cathode for a lithium-ion cell based on the belief that a higher surface area leads to the formation of more solid-electrolyte interface (SEI), a common cause of capacity irreversibility or capacity loss. We have herein defied this expectation and discovered that the meso-porous hybrid cathode materials can be superior cathode materials for lithium-ion cells, which could operate thousands of cycles without any significant capacity decay. This is so in spite of or despite of the notion that both graphite and carbon materials (including nano graphene), when used as an anode active material, have serious SEI issue. This is truly unexpected.

Even more surprisingly, the meso-porous phthalocyanine/graphene hybrid materials, when incorporated as a cathode active material having a specific surface area greater than 50 $m^2/g$ and pores of 2-50 nm in size, exhibit a specific capacity significantly higher than that of any commonly used lithium ion cell cathode. For instance, the micron-sized layered $LiCoO_2$ used in a lithium-ion battery exhibits a specific capacity typically lower than 160 mAh/g. The highest-capacity cathode active material for the lithium-ion cell is likely vanadium oxide that has a theoretical specific capacity of approximately 430 mAh/g, but a practically achievable capacity of 250 mAh/g. In contrast, we have routinely achieved a cathode specific capacity of 500-2,200 mAh/g when a meso-porous hybrid material is used as a cathode active material in a rechargeable lithium metal or lithium-ion cell.

In an embodiment of the present invention, one may choose to add a conductive additive and/or a binder material (e.g. binder resin or carbonized resin) to form an electrode (cathode or anode) of structural integrity. A conductive additive is generally needed in the anode of the presently invented lithium-ion cell since many of the non-carbon or non-graphite based anode active materials are inorganic materials (e.g., Si, SnO, and $Mn_3O_4$) that are not electrically conducting. The conductive additive or filler may be selected from any electrically conductive material, but is advantageously selected from graphite or carbon particles, carbon black, expanded graphite, graphene, carbon nanotube, carbon nano-fiber, carbon fiber, conductive polymer, or a combination thereof. The amount of conductive fillers is preferably no greater than 30% by weight based on the total cathode electrode weight (without counting the cathode current collector weight), preferably no greater than 15% by weight, and most preferably no greater than 10% by weight. The amount of binder material is preferably no greater than 15% by weight, more preferably no greater than 10%, and most preferably no greater than 5% by weight.

Preferred electrolyte types include liquid electrolyte, gel electrolyte, polymer electrolyte, solid electrolyte, and ionic liquid electrolyte (preferably containing lithium salts dissolved therein), or a combination thereof.

Although there is no limitation on the electrode thickness, the presently invented positive electrode preferably has a thickness greater than 100 μm, more preferably greater than 150 μm, and most preferably greater than 200 μm.

Another preferred embodiment of the present invention is a rechargeable lithium cell comprising: (a) an anode comprising an anode active material, wherein said anode active material is a prelithiated lithium storage material; (b) a cathode comprising a hybrid cathode active material composed of a graphene material and a phthalocyanine compound, wherein the graphene material is in an amount of from 0.1% to 99% by weight based on the total weight of the graphene material and the phthalocyanine compound combined; and (c) a porous separator disposed between the anode and the cathode and electrolyte in ionic contact with the anode and the cathode.

In this cell, the prelithiated lithium storage material in the anode is preferably in the form of a nano particle, nano disc, nano platelete, nano wire, nano-rod, nano belt, nano scroll, nano tube, nano filament, nano coating, or nano film. The pre-lithiated lithium storage material may be selected from: (a) a pre-lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), or a mixture thereof; (b) a pre-lithiated alloy or intermetallic compound of Si, Ge, Sn, Pb, Sb, Bi, Zn, Al, Ti, Co, Ni, Mn, Cd, or a mixture thereof; (c) a pre-lithiated oxide, carbide, nitride, sulfide, phosphide, selenide, telluride, or antimonide of Si, Ge, Sn, Pb, Sb, Bi, Zn, Al, Fe, Ti, Co, Ni, Mn, Cd, or a mixture or composite thereof, (d) a pre-lithiated salt or hydroxide of Sn; or (e) a pre-lithiated carbon or graphite material. Preferably, this anode active material is electrically connected directly to an anode current collector or is connected to an anode current collector through a binder and/or a conductive additive.

In a further preferred embodiment, the anode active material contains a mixture of a high capacity anode material and a high rate capable anode material, wherein the high rate capable anode material is selected from nano-scaled particles or filaments of a lithium transition metal oxide, lithiated $Co_3O_4$, lithiated $Mn_3O_4$, lithiated $Fe_3O_4$, $Li_4Ti_5O_{12}$, or a combination thereof, and the high capacity anode material is selected from pre-lithiated Si, Ge, Sn, SnO, or a combination thereof.

Preferably, the anode active material is prelithiated to an initial specific capacity of no less than 500 mAh/g (more preferably no less than 700 mAh/g, even more preferably no less than 1,000 mAh/g, further preferably no less than 1,500 mAh/g, and most preferably no less than 2,000 mAh/g) based on the anode active material weight. Preferably, when the lithium-ion cell containing such a prelithiated anode active material is discharged, the anode active material is not fully discharged; instead, the anode active material maintains at least 50% of the initial specific capacity. Materials such as Si, Ge, and Sn oxide can be prelithiated to an initial capacity of >1000 mAh/g; Si can be prelithiated to >4,000 mAh/g. These are preferred choices for an anode active material.

The carbonaceous or graphitic material for use in the anode of the instant invention may be graphite worms, exfoliated graphite flakes (with a thickness >100 nm), expanded graphite (with a thickness >100 nm), chemically treated graphite with an inter-graphene planar separation no less than 0.4 nm (preferably greater than 0.5 nm, more preferably greater than 0.6 nm), soft carbon (preferably, chemically etched or expanded soft carbon), hard carbon (preferably, chemically etched or expanded hard carbon), activated carbon (preferably, exfoliated activated carbon), carbon black (preferably, chemically etched or expanded carbon black), chemically expanded multi-walled carbon nano-tube, chemically expanded carbon fiber or nano-fiber, or a combination thereof. These carbonaceous or graphitic materials have one thing in common; they all have meso-scaled pores, enabling entry of electrolyte to access their interior graphene planes.

In one preferred embodiment, the meso-porous carbonaceous or graphitic material may be produced by using the following recommended procedures:
(A) dispersing or immersing a graphitic or carbonaceous material (e.g., powder of natural graphite, artificial graphite, meso-phase carbon, meso-carbon micro bead (MCMB), soft carbon, hard carbon, coke, polymeric carbon (carbonized resin), activated carbon (AC), carbon black (CB), multi-walled carbon nanotube (MWCNT), carbon nano-fiber (CNF), carbon or graphite fiber, meso-phase pitch fiber, and the like) in a mixture of an intercalant and/or an oxidant (e.g., concentrated sulfuric acid and nitric acid) and/or a fluorinating agent to obtain a graphite intercalation compound (GIC), graphite oxide (GO), graphite fluoride (GF), or chemically etched/treated carbon material;
(B) exposing the resulting GIC, GO, GF, or chemically etched/treated carbon material to a thermal shock, preferably in a temperature range of 600-1,100° C. for a short period of time (typically 15 to 60 seconds) to obtain exfoliated graphite or graphite worms; and optionally
(C) subjecting the resulting graphite worms to air jet milling to obtain expanded graphite (with graphite flakes thicker than 100 nm).

Alternatively, after step (A) above, the resulting GIC, GO, GF, or chemically etched/treated carbon/graphite material is subjected to repeated rinsing/washing to remove excess chemical. The rinsed products are then subjected to a drying procedure to remove water. The dried GO, GF, chemically treated CB, chemically treated AC, chemically treated MWCNT, chemically treated CNF, chemically treated carbon/graphite/pitch fiber can be used as a cathode active material of the presently invented high-capacity Li-ion cell. These chemically treated carbonaceous or graphitic materials can be further subjected to a heat treatment at a temperature preferably in the range of 150-1,100° C. for the purposes of thermally reducing the oxidized material, thermally exfoliating/expanding the carbonaceous/graphitic material (for increasing inter-planar spacing between two hexagonal carbon planes or graphene planes), and/or creating meso-scaled pores (2-50 nm) to enable the interior structure being accessed by electrolyte. It may be noted that these interior graphene planes remain stacked and interconnected with one another, but the above-described chemical/thermal treatments facilitate direct access of these interior graphene planes by lithium ion-carrying electrolyte.

The broad array of carbonaceous materials, such as a soft carbon, hard carbon, polymeric carbon (or carbonized resin), meso-phase carbon, coke, carbonized pitch, carbon black, activated carbon, or partially graphitized carbon, are commonly referred to as the disordered carbon material. A disordered carbon material is typically formed of two phases wherein a first phase is small graphite crystal(s) or small stack(s) of graphite planes (with typically up to 10 graphite planes or aromatic ring structures overlapped together to form a small ordered domain) and a second phase is non-crystalline carbon, and wherein the first phase is dispersed in the second phase or bonded by the second phase. The second phase is made up of mostly smaller molecules, smaller aromatic rings, defects, and amorphous carbon. Typically, the disordered carbon is highly porous (e.g., exfoliated activated carbon), or present in an ultra-fine powder form (e.g. chemically etched carbon black) having nano-scaled features (e.g. having meso-scaled pores and, hence, a high specific surface area).

Soft carbon refers to a carbonaceous material composed of small graphite crystals wherein the orientations of these graphite crystals or stacks of graphene planes inside the material are conducive to further merging of neighboring graphene sheets or further growth of these graphite crystals or graphene stacks using a high-temperature heat treatment. This high temperature treatment is commonly referred to as graphitization and, hence, soft carbon is said to be graphitizable.

Hard carbon refers to a carbonaceous material composed of small graphite crystals wherein these graphite crystals or stacks of graphene planes inside the material are not oriented in a favorable directions (e.g. nearly perpendicular to each other) and, hence, are not conducive to further merging of neighboring graphene planes or further growth of these graphite crystals or graphene stacks (i.e., not graphitizable).

Carbon black (CB) (including acetylene black, AB) and activated carbon (AC) are typically composed of domains of aromatic rings or small graphene sheets, wherein aromatic rings or graphene sheets in adjoining domains are somehow connected through some chemical bonds in the disordered phase (matrix). These carbon materials are commonly obtained from thermal decomposition (heat treatment, pyrolyzation, or burning) of hydrocarbon gases or liquids, or natural products (wood, coconut shells, etc). These materials per se (without chemical/thermal treatments as described above) are not good candidate cathode materials for the presently invented high-capacity Li-ion cells. Hence, preferably, they are subjected to further chemical etching or chemical/thermal exfoliation to form a meso-porous structure having a pore size in the range of 2-50 nm (preferably 2-10 nm). These meso-scaled pores enable the liquid electrolyte to enter the pores and access the graphene planes inside individual particles of these carbonaceous materials.

The preparation of polymeric carbons by simple pyrolysis of polymers or petroleum/coal tar pitch materials has been known for approximately three decades. When polymers such as polyacrylonitrile (PAN), rayon, cellulose and phenol formaldehyde were heated above 300° C. in an inert atmosphere they gradually lost most of their non-carbon contents. The resulting structure is generally referred to as a polymeric carbon. Depending upon the heat treatment temperature (HTT) and time, polymeric carbons can be made to be insulating, semi-conducting, or conducting with the electric conductivity range covering approximately 12 orders of magnitude. This wide scope of conductivity values can be further extended by doping the polymeric carbon with electron donors or acceptors. These characteristics uniquely qualify polymeric carbons as a novel, easy-to-process class of electro-active materials whose structures and physical properties can be readily tailor-made.

Polymeric carbons can assume an essentially amorphous structure, or have multiple graphite crystals or stacks of graphene planes dispersed in an amorphous carbon matrix. Depending upon the HTT used, various proportions and sizes of graphite crystals and defects are dispersed in an amorphous matrix. Various amounts of two-dimensional condensed aromatic rings or hexagons (precursors to graphene planes) can be found inside the microstructure of a heat treated polymer such as a PAN fiber. An appreciable amount of small-sized graphene sheets are believed to exist in PAN-based polymeric carbons treated at 300-1,000° C. These species condense into wider aromatic ring structures (larger-sized graphene sheets) and thicker plates (more graphene sheets stacked together) with a higher HTT or longer heat treatment time (e.g., >1,500° C.). These graphene platelets or stacks of graphene sheets (basal planes) are dispersed in a non-crystalline carbon matrix. Such a two-phase structure is a characteristic of some disordered carbon material.

There are several classes of precursor materials to the disordered carbon materials of the instant patent application. For instance, the first class includes semi-crystalline PAN in a fiber form. As compared to phenolic resin, the pyrolized PAN fiber has a higher tendency to develop small crystallites that are dispersed in a disordered matrix. The second class, represented by phenol formaldehyde, is a more isotropic, essentially amorphous and highly cross-linked polymer. The third class includes petroleum and coal tar pitch materials in bulk or fiber forms. The precursor material composition, heat treatment temperature (HTT), and heat treatment time (Htt) are three parameters that govern the length, width, thickness (number of graphene planes in a graphite crystal), and chemical composition of the resulting disordered carbon materials.

In the present investigation, PAN fibers were subjected to oxidation at 200-350° C. while under a tension, and then partial or complete carbonization at 350-1,500° C. to obtain polymeric carbons with various nano-crystalline graphite structures (graphite crystallites). Selected samples of these polymeric carbons were further heat-treated at a temperature in the range of 1,500-2,000° C. to partially graphitize the materials, but still retaining a desired amount of amorphous carbon (no less than 10%). Phenol formaldehyde resin and petroleum and coal tar pitch materials were subjected to similar heat treatments in a temperature range of 500 to 1,500° C. The disordered carbon materials obtained from PAN fibers or phenolic resins are preferably subjected to a chemical etching/expanding treatment using a process commonly used to produce activated carbon (e.g., treated in a KOH melt at 900° C. for 1-5 hours). This chemical treatment is intended for making the disordered carbon meso-porous, enabling electrolyte to reach the edges or surfaces of the constituent aromatic rings after a battery cell is made. Such an arrangement enables the lithium ions in the liquid electrolyte to readily attach onto exposed graphene planes or edges without having to undergo significant solid-state diffusion.

Certain grades of petroleum pitch or coal tar pitch may be heat-treated (typically at 250-500° C.) to obtain a liquid crystal-type, optically anisotropic structure commonly referred to as meso-phase. This meso-phase material can be extracted out of the liquid component of the mixture to produce isolated meso-phase particles or spheres, which can be further carbonized and graphitized.

The following examples serve to illustrate the preferred embodiments of the present invention and should not be construed as limiting the scope of the invention:

Example 1

Graphene Oxide from Sulfuric Acid Intercalation and Exfoliation of MCMBs

Meso-carbon microbeads (MCMBs) were supplied from China Steel Chemical Co. This material has a density of about 2.24 g/cm$^3$ with a median particle size of about 16 μm. MCMB (10 grams) were intercalated with an acid solution (sulfuric acid, nitric acid, and potassium permanganate at a ratio of 4:1:0.05) for 48 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 800° C. for 30 seconds to obtain a graphene material. A small quantity of each sample was mixed with water and ultrasonicated at 60-W power for 10 minutes to obtain a suspension. A small amount was sampled out, dried, and investigated with TEM, which indicated that most of the NGPs were between 1 and 10 layers. The graphene-water suspension was used for subsequent preparation of a graphene oxide (GO) cathode and a hybrid naphthalocyanine/GO cathode.

Example 2

Oxidation and Exfoliation of Natural Graphite to Produce GO

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798, 878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 7. The intent was to remove all sulfuric and nitric acid residue out of graphite interstices. The slurry was dried and stored in a vacuum oven at 60° C. for 24 hours.

The dried, intercalated (oxidized) compound was exfoliated by placing the sample in a quartz tube that was inserted into a horizontal tube furnace pre-set at 1,050° C. to obtain highly exfoliated graphite. The exfoliated graphite was dispersed in water along with a 1% surfactant at 45° C. in a flat-bottomed flask and the resulting graphene oxide (GO) suspension was subjected to ultrasonication for a period of 15 minutes. The suspension was then atomized in a heated chamber to obtain porous secondary particles that are approximately spherical in shape and 1-10 μm in size: These particles were packed and bonded into a meso-porous backbone structure to accommodate a phthalocyanine compound.

Example 3

Direct Ultrasonication of Natural Graphite to Produce Pristine Graphene

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting products are pristine graphene suspended in a water solution. The suspension can be made into conductive graphene paper having meso-scale pores via vacuum-assisted filtration, or made into graphene foam (with or without an added water soluble polymer, such as polyethylene oxide, PEO) using a freeze-drying procedure. A small amount of PEO (typically <0.1% by wt. in the water solution) was later carbonized to form a carbon binder that serves to bond graphene sheets into a foam of good structural integrity. The pores of this graphene foam can accommodate a phthalocyanine compound.

Example 4

Meso-Porous Soft Carbon as a Supporting and Protective Backbone for a Phthalocyanine Compound Chemically etched or expanded soft carbon was prepared from heat-treating a liquid crystalline aromatic resin (50/50 mixture of anthracene and pyrene) at 200° C. for 1 hour. The resin was ground with a mortar, and calcined at 900° C. for 2 h in a $N_2$ atmosphere to prepare the graphitizable carbon or soft carbon. The resulting soft carbon was mixed with small tablets of KOH (four-fold weight) in an alumina melting pot. Subsequently, the soft carbon containing KOH was heated at 750° C. for 2 h in $N_2$. Upon cooling, the alkali-rich residual carbon was washed with hot water until the outlet water reached a pH value of 7. The resulting chemically etched or expanded soft carbon was dried by heating at 60° C. in a vacuum for 24 hours. This material can be used in both the anode and cathode due to its high specific surface area and its ability to capture and store lithium atoms on its surfaces (if not covered by a phthalocyanine compound). These surfaces (inside pores) were also found to be particularly suitable for supporting various phthalocyanine compounds.

Example 5

Expanded "Activated Carbon" (E-AC) as a Supporting and Protective Porous Backbone for a Phthalocyanine Compound Activated carbon (AC, from Ashbury Carbon Co.) was treated with an acid solution (sulfuric acid, nitric acid, and potassium permanganate at a ratio of 4:1:0.05) for 24 hours. Upon completion of the reaction, the mixture was poured into deionized water and filtered. The treated AC was repeatedly washed in a 5% solution of HCl to remove most of the sulphate ions. The sample was then washed repeatedly with deionized water until the pH of the filtrate was neutral. The slurry was then dried in a vacuum oven pre-set at 70° C. for 24 hours. The dried sample was then placed in a tube furnace at 1,050° C. for 2 minutes to obtain expanded AC. This material can be used in both the anode and cathode of a lithium cell due to its high specific surface area and ability to capture and store Li atoms on its surfaces. These surfaces were also found to be particularly suitable for supporting both metal and metal-free phthalocyanine compounds that are themselves lithium-storing materials.

Example 6

Chemically Treated (Expanded) Needle Coke as a Supporting and Protective Porous Backbone for a Phthalocyanine Compound Anisotropic needle coke has a fully developed needle-shape texture of optical anisotropy. Volatile species of the raw coke was estimated to be around 5 wt. %. Activation was carried out using KOH in a reaction apparatus that consisted of a stainless steel tube and a nickel sample holder. KOH activation was carried out at 800° C. for 2 h under Ar flow. The coke/KOH ratio was varied between 1/1 and 1/4. Upon cooling, the alkali-rich coke was washed with hot water until the outlet water reached a pH value of 7. The resulting chemically etched or expanded coke was dried by heating at 60° C. in a vacuum for 24 hours. The treated coke is highly porous, having a pore size range of approximately 1-85 nm.

Example 7

Chemically Treated (Expanded) Petroleum Pitch-Derived Hard Carbon as a Supporting and Protective Porous Backbone for a Phthalocyanine Compound A pitch sample (A-500 from Ashland Chemical Co.) was carbonized in a tube furnace at 900° C. for 2 hours, followed by further carbonization at 1,200° C. for 4 hours. KOH activation was carried out at 800° C. for 2 h under Ar flow to open up the internal structure of pitch-based hard carbon particles. The hard carbon-based porous structure was found to have a particle size range of 3-100 nm and to be particularly suitable for supporting and protecting both metal and metal-free phthalocyanine compounds lodged therein.

Example 8

Chemically Activated Meso-phase Carbon and Production of Fluorinated Carbon as a Supporting and Protective Porous Backbone for a Phthalocyanine Compound Meso-carbon carbon particles (un-graphitized MCMBs) were supplied from China Steel Chemical Co. This material has a density of about 2.2 g/cm$^3$ with a median particle size of about 16 μm. This batch of meso-phase carbon was divided into two samples. One sample was immersed in $K_2CO_3$ at 900° C. for 1 h to form chemically activated meso-carbon. The chemically activated meso-phase carbons showed a BET specific surface area of 1,420 m$^2$/g. This material can be used in both the anode and cathode due to its high specific surface area and ability to capture and store metal atoms on its surfaces. These surfaces were found to be particularly suitable for supporting and protecting both metal and metal-free phthalocyanine compounds.

The other sample was subjected to a fluorination treatment. The meso-phase carbon particles were mixed with a PVDF binder in a NMP solution and coated onto an Al foil to form an electrode sheet. This electrode sheet was used as a working electrode in an electrochemical fluorination treatment apparatus consisting of a PTFE beaker, a Pt plate counter electrode, a Pd wire as a reference electrode, and $(C_2H_5)_3N\cdot3HF$ as electrolyte. The fluorination procedure was carried out at room temperature by potential sweeping from −1.0 V to 1.0 V at a 20 mV/s scan rate. X-ray diffraction data indicate that the inter-graphene spacing has been increased from 0.337 nm to 0.723 nm.

Example 9

Graphitic Fibrils from Pitch-based Carbon Fibers for Forming a Porous Backbone for a Phthalocyanine Compound Fifty grams of graphite fibers from Amoco (P-55S) were intercalated with a mixture of sulfuric acid, nitric acid, and potassium permanganate at a weight ratio of 4:1:0.05 (graphite-to-intercalate ratio of 1:3) for 24 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exposed to a heat shock treatment at 950° C. for 45 seconds. The sample was then submitted to a mechanical shearing treatment in a Cowles (a rotating-blade dissolver/disperser) for 10 minutes. The resulting graphitic fibrils were examined using SEM and TEM and their length and diameter were measured. Graphitic fibrils, alone or in combination with another particulate carbon/graphite material, can be packed into a meso-porous structure for supporting both metal and metal-free phthalocyanine compounds.

Example 10

Expanded Multi-walled Carbon Nanotubes (MWCNTs) as a Supporting and Protective Porous Backbone for a Phthalocyanine Compound Fifty grams of MWCNTs were chemically treated (intercalated and/or oxidized) with a mixture of sulfuric acid, nitric acid, and potassium permanganate at a weight ratio of 4:1: 0.05 (graphite-to-intercalate ratio of 1:3) for 48 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exposed to a heat shock treatment at 950° C. for 45 seconds. Expanded MWCNTs, alone or in combination with another particulate carbon/graphite material, can be packed into a meso-porous structure for supporting both metal and metal-free phthalocyanine compounds.

Example 11

Preparation of a Metal-free Naphthalocyanine-Graphene Oxide Hybrid Cathode

The starting material, 2,11,20,29-Tetra-tert-butyl-2,3-naphthalocyanine (NPc), was purchased from Aldrich. The graphene oxide used was prepared in Example 2. NPc chloroform solution ($9.90\times10^3$ mg/mL) was first mixed with GO-chloroform solution with increasing concentrations (from 0 to $1.64\times10^{-3}$ mg/mL), then sonicated for 15 min, centrifuged at 3000 rpm for 30 min. The supernatants were used for characterization by SEM, TEM, AFM, X-ray diffraction, and absorption and fluorescence spectroscopy. Graphene oxide (GO) has a large 2D planar structure and its extended, delocalized π-electron system is expected to facilitate interaction with NPc through the π-π stacking. In order to ensure sufficient interactions between them, a dilute NPc solution was first used because Pc molecules tend to aggregate at a high concentration. Then a series of concentrations of GO were chosen to interact with NPc and the resultant hybrid materials were monitored by the absorption and fluorescence spectra.

Comparative Example 11

Preparation of a Metal-Free Naphthalocyanine-Acetylene Black Hybrid Cathode

As a control sample, we have also prepared a hybrid material from acetylene black (AB) and GO. The procedure was similar to that for the NPc/GO, but the GO-chloroform solution was replaced by an AB-chloroform suspension.

Figure 7A:
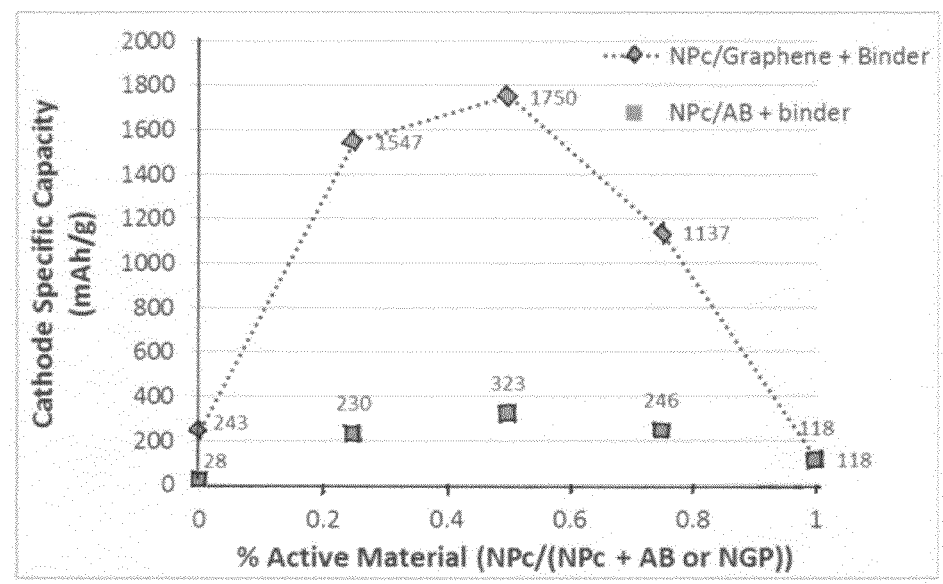
FIG. 7 (A) Cathode specific capacity of a series of composite cathodes made up of 2,11,20,29-Tetra-tert-butyl-2,3-naphthalocyanine (NPc) and acetylene black (AB); (B) Cathode specific capacity of a series of NPc-graphene hybrid cathodes and a series of NPc-meso-porous A-MCMB hybrid cathodes. Data for the control cell are also presented. Li metal foil was the anode active material.

The cathode specific capacities of a series of composite cathodes made up of 2,11,20,29-Tetra-tert-butyl-2,3-naphthalocyanine (NPc) and acetylene black (AB) were measured using a coin cell configuration containing lithium metal foil as the anode active material. The data, obtained from galvanostatic charge/discharge cycling tests, were plotted as a function of the NPC proportion at the cathode (NPc/[NPc+AB]) in FIG. 7(A). The corresponding data for NPc-GO cathodes were also included. It may be noted that the specific capacity of this GO material, when used alone without NPc, is 243 mAh/g and that of NPc without any conductive additive is 118 mAh/g (the theoretical lithium storage capacity of NPc is estimated to be at approximately 800 mAh/g provided that every available NPC site is utilized). These data have demonstrated that there exists a highly significant (actually quite dramatic) synergistic effect between NPc and this graphene material. The specific capacity values of 1137, 1547, and 1750 mAh/g (based on the NPc, GO, and binder weights combined, not just the NPc weight) are higher than the very best values of all cathode active materials ever reported for Li metal or Li-ion secondary cells.

Figure 7B:
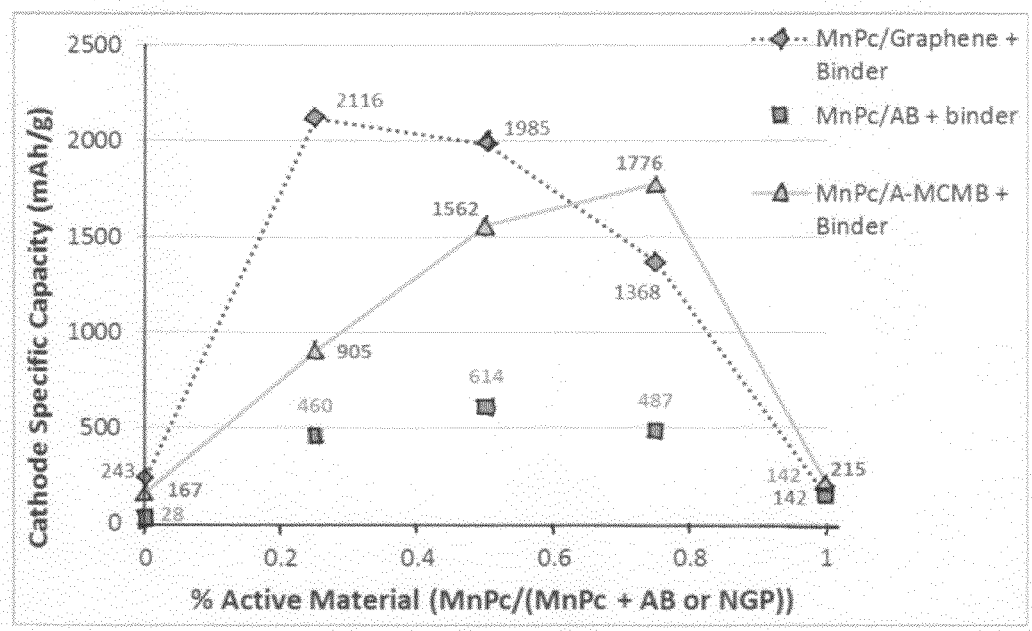

In order to further verify if this synergistic effect occurs in metal naphthalocyanine-graphene combinations, we proceeded to investigate the cathodes based on manganese naphthalocyanine (MnPc)-graphene and other hybrid cathodes as well. The results, summarized in FIG. 7(B), are equally surprising and even more impressive. A cathode specific capacity of 2,116 mAh/g is absolutely unprecedented. It is of significance to point out again that the graphene material used in this series of hybrid materials only provides a maximum specific capacity of 243 mAh/g when used alone. Further, the theoretical specific capacity of MnPc is approximately 1,700 mAh/g (based on the MnPc weight alone). The capacity of 2,116 mAh/g could not have been anticipated by any prior art teachings, alone or in combination.

By replacing graphene with a chemically activated MCMB material (pore size of approximately 4-35 nm), we have also observed a significant synergistic effect, as also indicated in FIG. 7(B). The specific capacity values of MnPc/A-MCMB cathodes are not as high as those of MnPc/graphene when the A-MCMB proportion is lower than 50%. However, the trend is reversed when the A-MCMB proportion is higher than 50% by weight, providing outstanding specific capacity. This observation further demonstrates that the meso-porous carbon/graphite materials produced by chemical activation, when used as a host to allow a naphthalocyanine compound to lodge in its pores, surprisingly bring out a synergistic effect in terms of the lithium storage capacity.

Example 12

Preparation of a Metal Naphthalocyanine-Reduced Graphene Oxide (RGO) Hybrid Cathode A suspension of single-layer GO sheets dispersed in water was first prepared. To this GO suspension was added water-soluble tetrasulfonate salt of copper phthalocyanine (TS-CuPc). The resulting hybrid suspension was then subjected to a chemical reduction treatment to convert GO to RGO in the presence of TSCuPc. Specifically, the TSCuPc-RGO hybrid materials were successfully prepared according to the following typical procedure: 10 mg of GO was dispersed in 10 mL of deionized water (DI water) by ultrasonication for 30 min using a cup-horn ultrasonicator (16 W power) to generate a homogeneous brown solution. The solution was centrifuged for 15 min at 5000 rpm to remove a small amount of aggregates. 10 mL of GO solution (1 mg/mL) was mixed with 25 mL of 0.01 M TSCuPc aqueous solution in a round-bottom flask with a magnetic stirring bar and a water-cooled condenser. Hydrazine hydrate (Sigma-Aldrich, St. Louis, Mo.) was added as a chemical reducing agent, and the solution was heated at 90° C. for 1 h under stirring. The color of the solution changed from dark blue to dark green. The resulting solution contained reduced single-layer graphene oxide sheets as confirmed by AFM images. A dilute hybrid aqueous solution was spin-coated onto a glass substrate and left overnight to evaporate the water and was used for AFM measurement. UV-vis absorption spectra of the thin films of TSCuPc and RGO/TSCuPc hybrid materials were also obtained.

Figure 11:
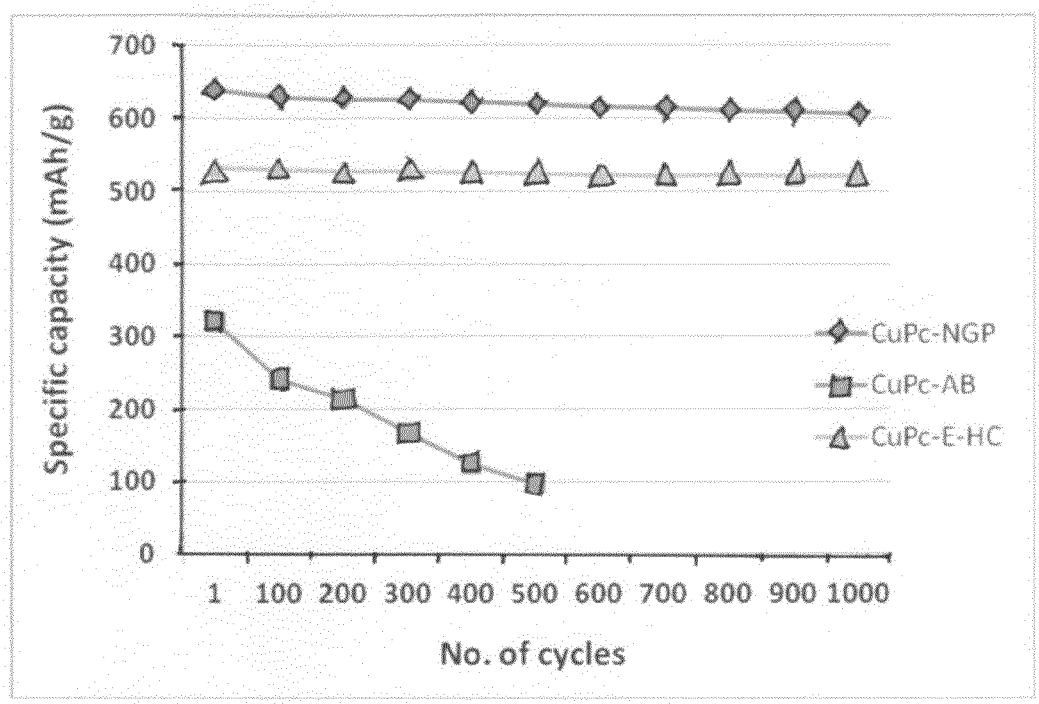
FIG. 11 The specific capacity of a RGO/TSCuPc hybrid cathode material, obtained from a coin cell configuration with Li metal as the anode active material and 1 M $LiClO_4$ in propylene carbonate (PC) solution as the electrolyte, is plotted as a function of the charge/discharge cycles. Data for an expanded hard carbon (E-HC)/TSCuPc hybrid cathode cell are also presented. E-HC has a meso-porous structure prior to TSCuPc infiltration. A baseline sample of TSCuPc with 50% by weight of AB as the conductive additive was also prepared in a similar manner.

The specific capacity of this RGO/TSCuPc hybrid cathode material, obtained from a coin cell configuration with Li metal as the anode active material and 1 M LiClO$_4$ in propylene carbonate (PC) solution as the electrolyte, is plotted as a function of the charge/discharge cycles (FIG. 11). A baseline sample of TSCuPc with 50% by weight of AB as the conductive additive was also prepared in a similar manner. The charge/discharge behaviors of this cell were also monitored with the specific capacity data of this cell being also included in FIG. 11. These data have clearly demonstrated that the CuPc-AB composite cathode has a fast capacity decay rate with the specific capacity dropping to an unacceptably low value in less than 100 cycles. In contrast, the graphene-enabled hybrid system exhibits a minimal capacity decay even after 1000 cycles.

By replacing RGO with a meso-porous hard carbon (pore size 3-11 nm) produced by chemical expansion and activation of a hard carbon material, we prepared and tested a CuPc-E-HC cell. The specific capacity of this meso-porous carbon cell is generally lower than that of the RGO-based cell, but the cycling stability is better. Clearly, the problems associated with naphthalocyanine solubility and its catalytic effect on electrolyte decomposition have been overcome by implementing a reduced graphene oxide or meso-porous carbon structure as a host for the naphthalocyanine compound. This discovery has not been taught and could not have been anticipated by any prior art teaching.

Example 13

Preparation of Transition Metal Naphthalocyanine-Graphene Hybrid Cathode Materials through Vapor Deposition An iron naphthalocyanine (FePc) powder sample was placed in one end (sealed end or source end, at a higher temperature of 600° C.) of the inner quartz tube of a two-tube furnace system and a pristine graphene sample was placed at the opposite end (open end, at a lower temperature of 200° C.). A stream of nitrogen was introduced into the space between the inner tube and the outer tube at a flow rate of 50 cm$^3$/min. The FePc was sublimed with the vapor condensed and deposited onto surfaces of graphene sheets placed downstream from the source end. The ratio between FePc and graphene was varied by adjusting the deposition time, from 0.5 hours to 5 hours. On a separate basis, a meso-porous soft carbon was prepared and then iron naphthalocyanine was sublimed and deposit into pores of this chemically activated soft carbon.

Example 14

Figure 8:
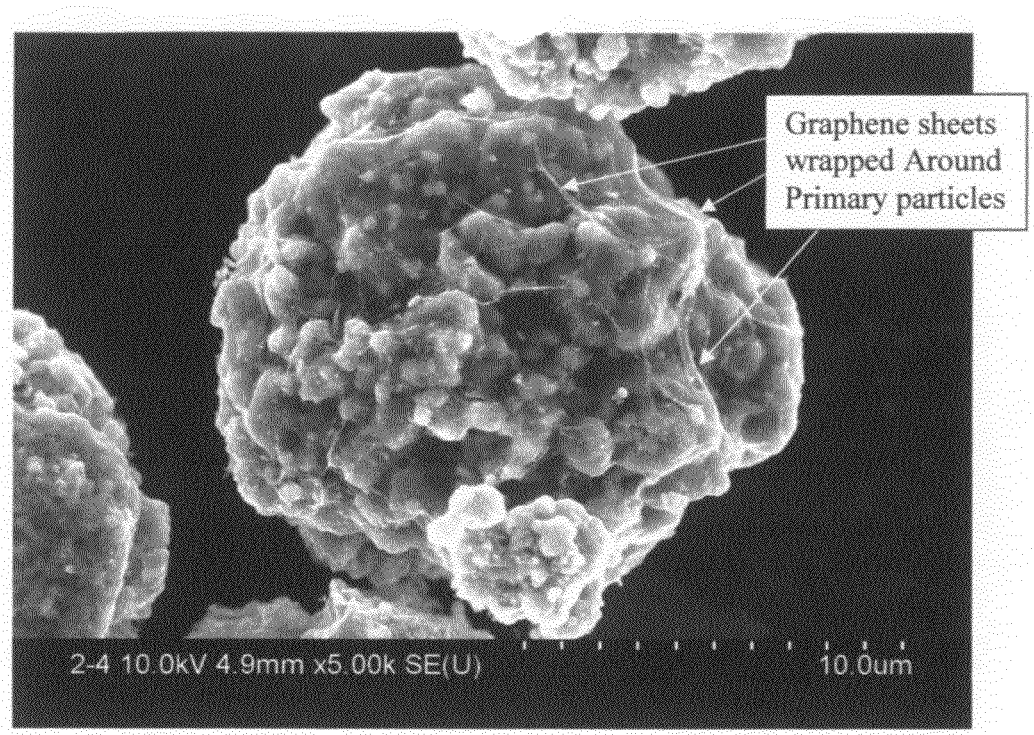
FIG. 8 SEM image of a secondary particulate consisting of primary particles of naphthalocyanine embraced by and wrapped around by graphene sheets.

Preparation of Transition Metal Naphthalocyanine-Graphene or Graphene Oxide Hybrid Cathode Materials through Co-precipitation from a Liquid Solution and/or Suspension Portion of the pristine graphene prepared in Example 3 was re-dispersed (partially dissolved) in NMP with the assistance of ultrasonication. Several cobalt naphthalocyanine (CoPc)/NMP solutions with different CoPc concentrations were also prepared. The graphene/NMP solution and CoPc/NMP solution were then mixed to obtain a precursor hybrid solution, which was then dried by removing a majority of NMP by heat in a chemical fume hood to form a slurry. Portion of the slurry was then cast onto a glass surface and the remaining portion was spray-dried to form secondary particulates that contain CoPc primary particles (20-85 nm) and graphene sheets, with some graphene sheets embracing and wrapping around CoPc particles (e.g. a SEM image of the secondary particulates is shown in FIG. 8).

We have observed that the secondary particulates of graphene-wrapped naphthalocyanine compound particles typically exhibit an electrical conductivity much greater than $10^{-4}$ S/cm, more typically greater than $10^{-2}$ S/cm when the graphene content exceeds 5% by weight, much greater than 1 S/cm when the graphene content exceeds 10%, and even greater than 100 S/cm when the graphene content exceeds 20%.

Example 15

Preparation of Metal Naphthalocyanine-Graphene Hybrid Cathode Materials through Simple Powder Blending (with or without Subsequent Ball-Milling)

In a typical procedure, a mixture of FePc and RGO powder with a controlled weight ratio was hand-ground in a mortar by pestle for 20 minutes to 1 hour. Portion of the powder mixture was then ball-milled for 1-3 hours. NiPc and GO powders were also prepared in a similar manner.

Example 16

Meso-Porous Soft Carbon as an Anode Active Material

Chemically etched or expanded soft carbon was prepared from a liquid crystalline aromatic resin. The resin was ground with a mortar, and calcined at 900° C. for 2 h in a N$_2$ atmosphere to prepare the graphitizable carbon or soft carbon. The resulting soft carbon was mixed with small tablets of KOH (four-fold weight) in an alumina melting pot. Subsequently, the soft carbon containing KOH was heated at 750° C. for 2 h in $N_2$. Upon cooling, the alkali-rich residual carbon was washed with hot water until the outlet water reached a pH value of 7. The resulting chemically etched or expanded soft carbon was dried by heating at 60° C. in a vacuum for 24 hours. The high surface areas are available to capture and store lithium when a cell is recharged. With these surfaces, the re-deposited lithium layer appears to be more stable with respect to the electrolyte as compared to a bare current collector, such as copper foil alone.

Example 17

Expanded Activated Carbon (E-AC) as an Anode Active Material

Activated carbon (AC, from Ashbury Carbon Co.) was treated with an acid solution (sulfuric acid, nitric acid, and potassium permanganate at a ratio of 4:1:0.05) for 24 hours. Upon completion of the reaction, the mixture was poured into deionized water and filtered. The treated AC was repeatedly washed in a 5% solution of HCl to remove most of the sulphate ions. The sample was then washed repeatedly with deionized water until the pH of the filtrate was neutral. The slurry was then dried in a vacuum oven pre-set at 70° C. for 24 hours. The dried sample was then placed in a tube furnace at 1,050° C. for 2 minutes to obtain expanded AC.

Example 18

Chemically Treated Needle Coke as an Anode Active Material

Anisotropic needle coke has a fully developed needle-shape texture of optical anisotropy. Volatile species of the raw coke was estimated to be around 5 wt. %. Activation was carried out using KOH in a reaction apparatus that consisted of a stainless steel tube and a nickel sample holder. KOH activation was carried out at 800° C. for 2 h under Ar flow. The coke/KOH ratio was varied between 1/1 and 1/4. Upon cooling, the alkali-rich coke was washed with hot water until the outlet water reached a pH value of 7. The resulting chemically etched or expanded coke was dried by heating at 60° C. in a vacuum for 24 hours.

Example 19

Chemically Treated Petroleum Pitch-Derived Hard Carbon as an Anode Active Material A pitch sample (A-500 from Ashland Chemical Co.) was carbonized in a tube furnace at 900° C. for 2 hours, followed by further carbonization at 1,200° C. for 4 hours. KOH activation was carried out at 800° C. for 2 h under Ar flow to open up the internal structure of pitch-based hard carbon particles.

Example 20

Chemically Expanded Meso-phase Carbon as an Anode Active Material

Meso-carbon microbeads (MCMBs) were supplied from China Steel Chemical Co. This material has a density of about 2.24 g/cm$^3$ with a median particle size of about 16 p.m. The MCMB powder was immersed in $K_2CO_3$ at 900° C. for 1 h. The chemically treated meso-phase carbons showed a BET specific surface area of 1,420 m$^2$/g.

Example 21

Graphitic Fibrils from Pitch-Based Carbon Fibers as an Anode Active Material

Fifty grams of graphite fibers from Amoco (P-55S) were intercalated with a mixture of sulfuric acid, nitric acid, and potassium permanganate at a weight ratio of 4:1:0.05 (graphite-to-intercalate ratio of 1:3) for 24 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exposed to a heat shock treatment at 950° C. for 45 seconds. The sample was then submitted to a mechanical shearing treatment in a Cowles (a rotating-blade dissolver/disperser) for 10 minutes. The resulting graphitic fibrils were examined using SEM and TEM and their length and diameter were measured.

Example 22

Expanded Multi-Walled Carbon Nanotubes (MWCNTs) as an Anode Active Material

Fifty grams of MWCNTs were chemically treated (intercalated and/or oxidized) with a mixture of sulfuric acid, nitric acid, and potassium permanganate at a weight ratio of 4:1:0.05 (graphite-to-intercalate ratio of 1:3) for 48 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exposed to a heat shock treatment at 950° C. for 45 seconds.

Example 23

Prelithiated and Non-lithiated Nano Cobalt Oxide ($Co_3O_4$) Anodes

An appropriate amount of inorganic salts $Co(NO_3)_2.6H_2O$ was added to an ammonia solution ($NH_3.H_2O$, 25 wt %). The resulting precursor suspension was stirred for 4 hours under an argon flow condition to ensure a complete reaction. The resulting $Co(OH)_2$ precursor suspension was filtered and dried under vacuum at 70° C. to obtain a $Co(OH)_2$. This precursor was calcined at 450° C. in air for 2 h to form nano $Co_3O_4$ powder with an average particle size of approximately 34 nm.

The working electrodes (for use as an anode in a lithium-ion cell) were prepared by mixing 85 wt % active material ($Co_3O_4$ powder), 7 wt % acetylene black (Super-P), and 8 wt % polyvinylidene fluoride (PVDF, 5 wt % solid content) binder dissolved in N-methyl-2-pyrrolidinone (NMP) to form a slurry-like mixture. After coating the slurry on Cu foil, the electrode was dried at 120° C. in vacuum for 2 h to remove the solvent before pressing. The electrode prepared was divided into two pieces: one piece was for use as a non-prelithiated anode and the other piece was prelithiated electrochemically by following the procedure described below:

The second piece of $Co_3O_4$ electrode was immersed in a liquid electrolyte prepared by dissolving 1 M $LiPF_6$ electrolyte solution in a mixture of ethylene carbonate (EC) and diethyl carbonate (DEC) (EC-DEC, 1:1 v/v). A piece of lithium foil was used as a counter-electrode, which was also immersed in the electrolyte. Direct current was used to charge the $Co_3O_4$ electrode until an amount of lithium equivalent to approximately 860 mAh/g based on cobalt oxide weight was inserted into $Co_3O_4$. The prelithiation procedure was performed in an argon-filled glove-box.

Subsequently, the lithiated and non-lithiated electrodes were separately cut into disks (diameter=12 mm) for use as an anode. In the cell containing a non-lithiated $Co_3O_4$ anode, a thin sheet of lithium foil (as a lithium source) was attached to the anode surface and a piece of porous separator was, in turn, stacked on top of the lithium foil. Pieces of electrodes prepared from the iron naphthalocyanine (FePc)-graphene of Example 6 and coated on an aluminum foil (cathode current collector) were used as a cathode to form a CR2032 coin-type cell. Celgard 2400 membrane was used as separator, and 1 M $LiPF_6$ electrolyte solution dissolved in a mixture of ethylene carbonate (EC) and diethyl carbonate (DEC) (EC-DEC, 1:1 v/v) was used as cell electrolyte. The cell assembly was performed in an argon-filled glove-box. The CV measurements were carried out using a CHI-6 electrochemical workstation at a scanning rate of 1 mV/s.

Comparative Example 23

Li-Ion Cells Containing a Prelithiated or Non-lithiated Cobalt Nano Oxide ($Co_3O_4$) Anode and a Lithium Iron Phosphate Cathode Lithium iron phosphate $LiFePO_4$ is a promising candidate cathode material in lithium-ion batteries for electric vehicle applications. The advantages of $LiFePO_4$ as a cathode active material includes a high theoretical capacity (170 mAh/g), environmental benignity, low resource cost, good cycling stability, high temperature capability, and prospect for a safer cell compared with $LiCoO_2$. For comparison purposes, we have also prepared similar Li-ion cells containing $LiFePO_4$ as the cathode active material.

The electrochemical performance of the prelithiated $Co_3O_4$ anode/FePc-graphene cell (pore size of graphene cathode=11-71 nm), pre-lithiated $Co_3O_4$/FePc-meso-graphene cell (graphene cathode pore size=4-12 nm), lithiated $Co_3O_4$/$LiFePO_4$ cell, and non-lithiated $Co_3O_4$/$LiFePO_4$ cell was also evaluated by galvanostatic charge/discharge cycling at a current density of 50 mA/g, using a LAND electrochemical workstation.

Figure 9:
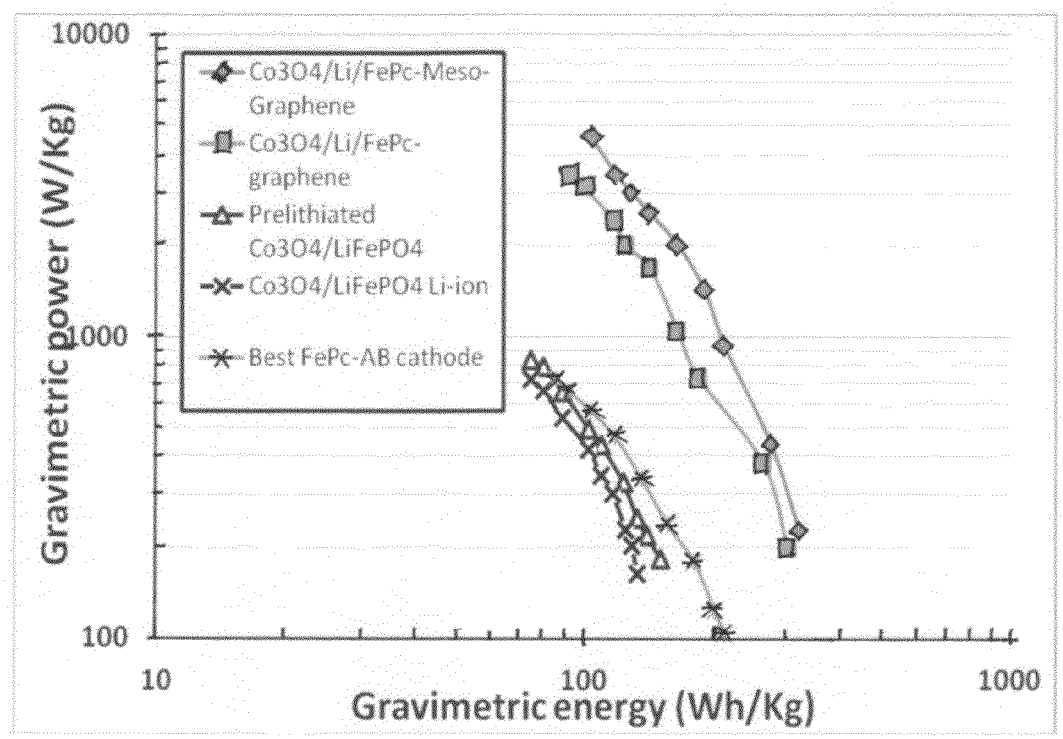
FIG. 9 Ragone plot of five types of electrochemical cells: (i) a Li-ion cell using FePc-graphene as a cathode active material and a prelithiated $Co_3O_4$ anode active material; (ii) another lithium-ion cell using FePc-meso-porous graphene structure as a cathode active material and a prelithiated $Co_3O_4$ anode active material; (iii) a prior art Li-ion cell using prelithiated $Co_3O_4$ as the anode active material and $LiFePO_4$ as the cathode active material; (iv) another prior art Li-ion cell using non-prelithiated $Co_3O_4$ as the anode active material and $LiFePO_4$ as the cathode active material; and (v) a prior art lithium metal cell using Li metal foil as the anode active material and FePc-AB as the cathode active material (50% FePc and 50% AB).

The Ragone plots of five types of electrochemical cells are presented in FIG. 9. These data have demonstrated that the presently invented Li-ion cells using FePc-graphene hybrid as a cathode active material exhibit exceptional energy density and relatively good power density. Both of the new cells (both having a pre-lithiated $Co_3O_4$ anode active material and graphene-FePc hybrid cathode) have an energy density higher than 300 Wh/kg, which is significantly greater than the typical 120-150 Wh/kg of prior art lithium-ion cells. Most surprisingly, these cells can also deliver a power density that is 10 times higher than those of prior art Li-ion cells (typically <0.5 kW/kg). The power density of the new cell reaches 6.7 kW/kg, which has never been achieved with any prior art lithium-ion cells. The implementation of a hybrid FePc-graphene material as a cathode active material has made it possible to achieve both high energy density and high power density.

As a point of reference, the typical power density of symmetric supercapacitors (noted for their superior power density) is 3-6 kW/kg; but their energy density is 5-8 Wh/kg. The presently invented Li-ion cells have achieved both high energy density and high power density that cannot be achieved with current supercapacitors or lithium-ion batteries.

For comparison purposes, the Ragone plot of a Li-ion cell containing a prelithiated $Co_3O_4$ anode and a composite cathode made of FePc (50% by weight) and acetylene black (50% AB) is also included in FIG. 9. Clearly, this very best member of the series of FePc-AB based cells does not even come close to the FePc-graphene based cells in terms of both energy density and power density (rate capability).

Another unexpected result comes from a comparison between porous graphene/FePc hybrid (graphene structure having a pore size range of 11-71 nm) and a meso-porous graphene/FePc hybrid (meso-porous graphene structure having a pore size range of 4-12 nm). The meso-porous structure gives rise to a higher energy density and higher power density. The reasons for such a difference remain to be investigated.

Example 24

Li-ion Cells having a Prelithiated Tin Oxide Anode and a Ball-milled NiPc-RGO Cathode Tin oxide ($SnO_2$) nano particles were obtained by the controlled hydrolysis of $SnCl_4.5H_2O$ with NaOH using the following procedure: $SnCl_4.5H_2O$ (0.95 g, 2.7 m-mol) and NaOH (0.212 g, 5.3 m-mol) were dissolved in 50 mL of distilled water each. The NaOH solution was added drop-wise under vigorous stirring to the tin chloride solution at a rate of 1 mL/min. This solution was homogenized by sonication for 5 min. This solution was divided into two portions. One portion of the resulting hydrosol was reacted with a graphene oxide dispersion supplied by Angstron Materials, Inc. (Dayton, Ohio) for 3 hours and the other portion was not mixed with graphene oxide.

To this graphene oxide mixed solution and un-mixed solution separately, few drops of 0.1 M of $H_2SO_4$ were added to flocculate the product. The precipitated solid was collected by centrifugation, washed with water and ethanol, and dried in vacuum. The dried product was heat-treated at 400° C. for 2 h under Ar atmosphere. The graphene oxide-assisted sample was found to contain mostly nano-scaled tin oxide particles with an average particle size of 27 nm. The presence of graphene oxide serves to regulate the nucleation and growth of tin oxide crystals, promoting the formation of nano particles. The other sample contains sub-micron and micron-scaled tin oxide particles with an average diameter >1.3 µm.

The battery cells from the graphene oxide-regulated particulates (containing nano-scaled $SnO_2$) and the micron-scaled $SnO_2$ particles (having acetylene black particles as a conductive filler) were prepared using a procedure described in Example 23. The tin oxide was electrochemically prelithiated up to a specific capacity of approximately 1,200 mAh/g. The testing methods were also similar to those used in Example 23.

Comparative Example 24B

Prelithiated Tin Oxide as the Anode Active Material and Ball-Milled NiPc-AC Composite as the Cathode Active Material in a Conventional Li-Ion Cell For comparison purposes, we have also prepared a corresponding lithium-ion cell containing prelithiated tin oxide as the anode active material and ball-milled NiPc-AC as the cathode active material (AC=activated carbon). We also proceeded to chemically expand/exfoliate some AC to obtain meso-porous AC, which was used to accommodate NiPc for yet another cell.

Figure 10:
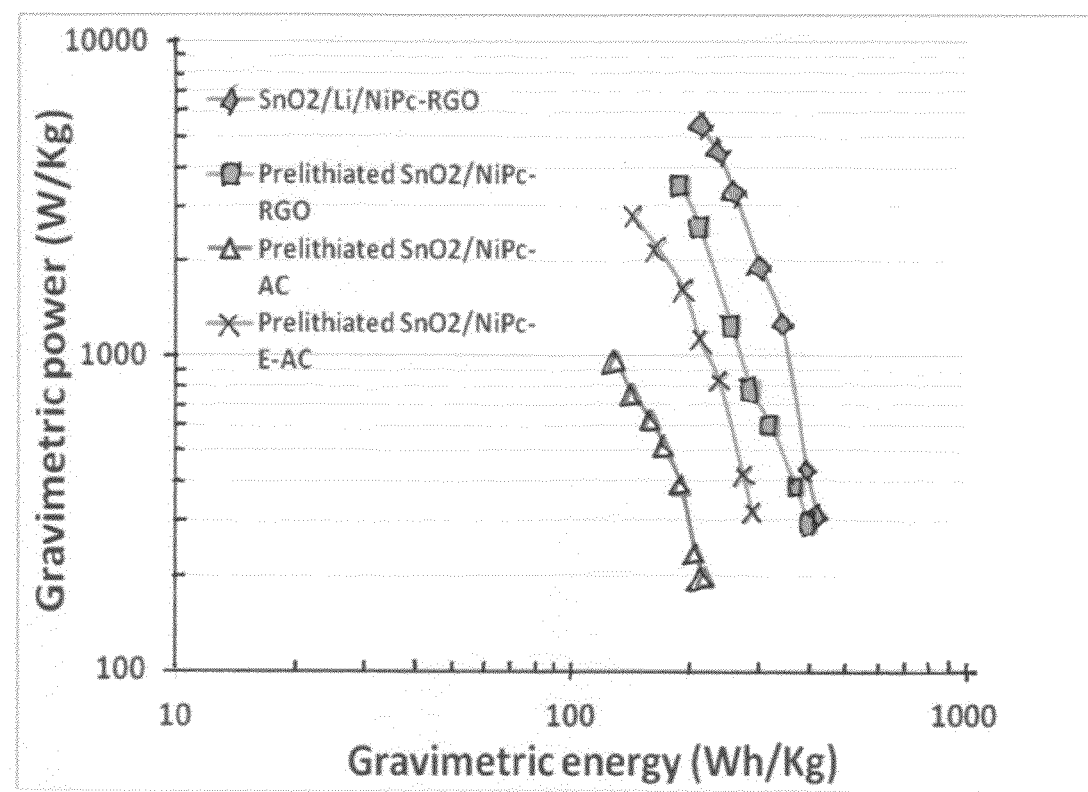
FIG. 10 Ragone plot of four electrochemical cells: (i) a Li-ion cell using NiPc-RGO as a cathode active material, $SnO_2$ as an anode active material, and Li foil as a lithium ion source; (ii) another lithium-ion cell using NiPc-RGO as a cathode active material and prelithiated $SnO_2$ as an anode active material; (iii) a Li-ion cell using prelithiated $SnO_2$ as the anode active material and NiPc-AC (activated carbon) as a cathode active material; and (4) a Li-ion cell using prelithiated $SnO_2$ as the anode active material and NiPc supported and protected by chemically expanded/exfoliated AC (meso-AC) at the cathode.

Presented in FIG. 10 are the Ragone plots of four types of electrochemical cells. Two of the cells represent two examples of the presently invented NiPc-RGO cathode-based Li-ion cells: one containing non-lithiated $SnO_2$ nano particles as an anode active material and Li foil as a lithium ion source and the other containing prelithiated $SnO_2$ micron particles as an anode active material. In both cases, the $SnO_2$ particles were bonded to the anode current collector with a resin binder, along with a conductive additive. The cell with nano-scaled $SnO_2$ anode particles exhibits a higher energy density as compared with its micron-scale $SnO_2$ counterpart. These two cells exhibit an exceptionally high energy density (>400 Wh/kg), which is significantly greater than those of corresponding Li-ion cell (using prelithiated $SnO_2$ as the anode active material and NiPc-AC as a cathode active material). There has been no cathode material thus far reported in the prior art that could enable a lithium-ion cell containing an anode to exhibit an energy density higher than 300 Wh/kg. This is clearly a very impressive and unexpected result.

When chemically expanded/exfoliated AC (meso-AC) was used to support and protect NiPc in the cathode, the energy density and power density of the cell were significantly improved. This further demonstrates the importance of having a meso-porous structure at the cathode.

Example 25

Prelithiated Si Nanowires as an Anode Active Material and MnPc-RGO or MnPc-E-SC (Expanded Soft Carbon) as a Cathode Active Material In a typical procedure for preparing Si nanowires, approximately 2.112 g of silicon powders (average diameter 2.64 μm) were mixed with 80 ml of a 0.1 M aqueous solution of $Ni(NO_3)_2 \cdot 6H_2O$ and vigorously stirred for 30 min. Then, water was evaporated in a rotary evaporator and the solid remnants were completely dried in an oven at 150° C. The final sample (Ni-impregnated Si powers) was obtained by grinding the solids in a mortar.

Subsequently, 0.03 g of Ni-impregnated Si particles was placed in a quartz boat, and the boat was placed in a tube furnace. The sample was reduced at 500° C. for 4 hours under flowing Ar (180 sccm) and $H_2$ (20 sccm); then the temperature was raised to 990° C. to synthesize Si nanowires. For the purpose of separating Si nanowires, for instance, every 0.1 g of the reacted Si powders was mixed with 10 ml of ethanol and the resulting mixture was sonicated for 1 hour. Subsequently, Si nanowires were separated from the Si powders by centrifuging at 5,000 rpm for 10 min.

Si nanowires were mixed with acetylene black particles to prepare anodes. The electrodes made were lithiated by using a procedure similar to that described in Example 16. Coin cells were similarly made using MnPc-RGO as the cathode active material, but three types of materials separately as the anode active material: (i) prelithiated Si nanowires, (ii) Li metal foil alone, and (iii) expanded MWCNTs with Li metal foil.

Coin cells using MnPc-RGO or MnPc-E-SC as a cathode active material (+10% PVDF as a resin binder) and the three anode active materials were made and tested. In all cells, the separator used was one sheet of micro-porous membrane (Celgard 2500). The current collector for the cathode was a piece of carbon-coated aluminum foil and that for the anode was Cu foil. The electrolyte solution was 1 M $LiPF_6$ dissolved in a mixture of ethylene carbonate (EC) and dimethyl carbonate (DMC) with a 3:7 volume ratio. The separator was wetted by a minimum amount of electrolyte to reduce the background current. Cyclic voltammetry and galvanostatic measurements of the lithium cells were conducted using an Arbin 32-channel supercapacitor-battery tester at room temperature (in some cases, at a temperature as low as −40° C. and as high as 60° C.).

Figure 12:
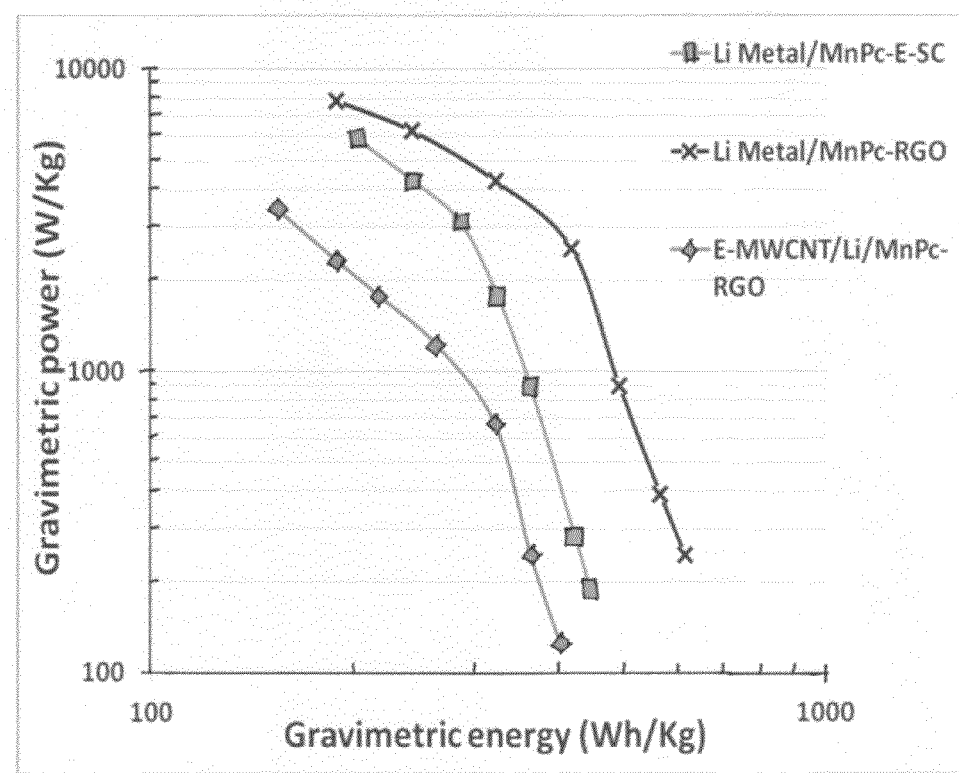
FIG. 12 Ragone plot of three types of electrochemical cells: two using MnPc-RGO as the cathode active material and one using MnPc-E-SC (chemically treated soft carbon) cathode, but with three types of anode active material: (i) prelithiated Si nanowires, (ii) Li metal foil alone, and (iii) expanded MWCNTs with Li metal foil.

The Ragone plots of the three types of electrochemical cells are shown in FIG. 12 One of the MnPc-RGO cathode-based Li cells of the present invention are capable of delivering a cell-level energy density greater than 600 Wh/kg, an unprecedented value of all lithium-ion cells ever reported. The other two (one having a meso-porous E-SC supported MnPc cathode) can store an energy density >400 Wh/g, a very impressive value as well. These cells are also capable of delivering a power density of 3-6 kW/kg, comparable to those of the best symmetric supercapacitors. The anode containing only the Li foil appear to deliver the best power density; however, the cycling stability of this cell is not as good as the other two cells that contain an intercalation compound as an anode active material.

In summary, after extensive and in-depth studies, we have developed a new rechargeable lithium battery technology based on new electrochemistry:

(1) We have discovered that a broad array of naphthalocyanine compounds, in combination with a meso-porous structure made of a conductive material, can be used as a cathode active material of a rechargeable lithium cell (lithium metal secondary cell or lithium-ion cell). We have further observed that these naphthalocyanine-graphene hybrid materials can exhibit a specific capacity significantly higher than 1,000 mAh/g and, in several samples, the capacity has exceeded 2,000 mAh/g. This has been most surprising and has not been reported or predicted by those who work in the battery industry or the field of electrochemistry. All the commonly used cathode active materials for lithium-ion cells have a practical specific capacity lower than 250 mAh/g (mostly lower than 200 mAh/g).

(2) The implementation of a naphthalocyanine-graphene hybrid material cathode in a rechargeable lithium cell has led to an unprecedentedly high energy density that is typically greater than 300 Wh/kg (based on the total cell weight), often greater than 400 Wh/kg, and even greater than 600 Wh/kg in several cases. This cell can be charged and discharged for thousands of cycles with very little capacity fade. It is no exaggeration to state that this is truly a revolution in lithium battery industry.

(3) By judiciously combining a meso-porous conductive material with a naphthalocyanine compound, we have overcome several longstanding and challenging technical issues that have thus far impeded the commercialization of lithium secondary battery having a naphthalocyanine compound-based cathode:

a. These cathode active materials are electrically insulating and, hence, require the use of a large amount of conductive additives (e.g. carbon black, CB, or acetylene black, AB) that are electrochemically inactive materials (not contributing to lithium storage, yet adding extra weights to the cell). Typically, up to >50% by weight of inactive materials has to be added. In contrast, a wide range of meso-porous material weight fractions, small or large, can be used and, in all proportions except for the case of <1% of graphene, the improvement has been dramatic and synergistic.

b. The prior art lithium metal cells having a naphthalocyanine cathode exhibit very poor rate capability. In other words, their lithium storing capacity drops significantly when a higher charge/discharge rate or higher current density is imposed on the cell. It appears that the presence of a highly porous material can significantly reduce the dimensions of the naphthalocyanine compound crystal, thereby reducing the required lithium diffusion paths and increasing the lithium storing/releasing rates. Somehow the presence of a naphthalocyanine compound also enhances the lithium storage capacity of a graphene material. In other words, the co-existence of both a naphthalocyanine compound and a meso-porous conductive material unexpectedly lead to an exceptional cathode specific capacity and cell energy density that cannot be achieved by either component alone.

c. The prior art cells having a naphthalocyanine cathode are not very reversible and typically have very poor cycling stability and short cycle life. One reason responsible for this poor cycle stability is likely due to the notion that most of these cathode active materials are soluble in the liquid electrolyte, gradually losing the amount of cathode active material available for lithium storage. The presence of a meso-porous structure appears to have alleviated or even eliminated this problem.

d. All the metal phthalocyanine compounds (MPc) have a catalytic effect on decomposition of electrolytes, creating cycle reversibility and long-term stability issues. The presence of a meso-porous carbon/graphite material appears to have alleviated or even eliminated these problems. This beneficial effect is particularly pronounced in those cases where the pore sizes are less than 10 nm. Not wishing to be bound by theory, but it is further possible that the natural affinity between phthalocyanine and a meso-porous carbon/graphite material has favorably altered the chemical environment through charge transfer between the two materials when in intimate contact with each other, thereby significantly reducing the catalytic interaction of phthalocyanine with the electrolyte phase.

We claim:

1. A rechargeable lithium cell comprising:
(a) a anode comprising an anode active material, wherein said anode active material is a prelithiated lithium storage material or a combination of a lithium storage material and a lithium ion source selected from lithium metal, lithium alloy, or lithium-containing compound;
(b) a cathode comprising a hybrid cathode active material consisting of a meso-porous structure of a carbon, graphite, metal, or conductive polymer and a phthalocyanine compound, wherein said phthalocyanine compound is selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, silver phthalocyanine, a metal-free phthalocyanine, a chemical derivative thereof, or a combination thereof, and wherein said meso-porous structure is in an amount of from 1% to 99% by weight based on the total weight of the meso-porous structure and the phthalocyanine compound combined, and wherein said meso-porous structure has a meso-scale pore with a size from 2 nm to 50 nm to accommodate the phthalocyanine compound therein; and
(c) electrolyte or a combination of electrolyte and a porous separator, wherein said separator is disposed between said anode and said cathode and the electrolyte is in ionic contact with said anode and said cathode.

2. The rechargeable lithium cell of claim 1, wherein said meso-porous structure is made from a material selected from graphene, graphene oxide, reduced graphene oxide, graphene fluoride, doped graphene, functionalized graphene, expanded graphite with an inter-graphene spacing greater than 0.4 nm, exfoliated graphite or graphite worms, chemically etched or expanded soft carbon, chemically etched or expanded hard carbon, exfoliated activated carbon, chemically etched or expanded carbon black, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-graphene planar separation no less than 0.4 nm, chemically expanded carbon nano-fiber, chemically activated carbon nano-tube, chemically treated carbon fiber, chemically activated graphite fiber, chemically activated carbonized polymer fiber, chemically treated coke, meso-phase carbon, meso-porous carbon, or a combination thereof.

3. The rechargeable lithium cell of claim 2, wherein said expanded spacing is greater than 0.5 nm and said meso-porous structure has a specific surface area greater than 100 $m^2/g$.

4. The rechargeable lithium cell of claim 1, wherein said meso-porous structure is made from a graphene material selected from a single-layer sheet or multi-layer platelet of graphene, graphene oxide, fluorinated graphene, halogenated graphene, hydrogenated graphene, nitrogenated graphene, pristine graphene, doped graphene, boron doped graphene, nitrogen doped graphene, chemically treated graphene, reduced graphene oxide, functionalized graphene, functionalized graphene oxide, or a combination thereof, and wherein this graphene material alone or in combination with at least another material forms a meso-porous structure having a pore size from 2 nm to 50 nm.

5. The rechargeable lithium cell of claim 1, wherein said meso-porous structure has a pore size in the range of 5 to 10 nm.

6. The rechargeable lithium cell of claim 1, wherein said meso-porous structure is a porous, electrically conductive material selected from metal foam, carbon-coated metal foam, graphene-coated metal foam, metal web or screen, carbon-coated metal web or screen, graphene-coated metal web or screen, perforated metal sheet, carbon-coated porous metal sheet, graphene-coated porous metal sheet, metal fiber mat, carbon-coated metal-fiber mat, graphene-coated metal-fiber mat, metal nanowire mat, carbon-coated metal nanowire mat, graphene-coated metal nano-wire mat, surface-passivated porous metal, porous conductive polymer film, conductive polymer nano-fiber mat or paper, conductive polymer foam, carbon foam, carbon aerogel, carbon xerox gel, graphene foam, graphene oxide foam, reduced graphene oxide foam, or a combination thereof.

7. The rechargeable lithium cell of claim 1, wherein said meso-porous structure has a specific surface area greater than 100 $m^2/g$.

8. The rechargeable lithium cell of claim 1, wherein said meso-porous structure has a specific surface area greater than 500 m$^2$/g.

9. The rechargeable lithium cell of claim 1, wherein said meso-porous structure has a specific surface area greater than 1,000 m$^2$/g.

10. The rechargeable lithium cell of claim 1, wherein said lithium storage material is selected from: (a) silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), iron (Fe), cadmium (Cd), or a mixture thereof; (b) alloy or intermetallic compound of Si, Ge, Sn, Pb, Sb, Bi, Zn, Al, Ti, Fe, Co, Ni, Mn, Cd, or a mixture thereof; (c) oxide, carbide, nitride, sulfide, phosphide, selenide, telluride, or antimonide of Si, Ge, Sn, Pb, Sb, Bi, Zn, Al, Fe, Ti, Co, Ni, Mn, Cd, or a mixture or composite thereof; (d) salt or hydroxide of Sn; or (e) a carbon or graphite material.

11. The rechargeable lithium cell of claim 1, wherein said phthalocyanine compound is lodged in a pore or a plurality of pores of said meso-porous structure to form a hybrid structure having an electrical conductivity no less than 10$^{-2}$ S/cm.

12. The rechargeable lithium cell of claim 11, wherein said hybrid structure has an electrical conductivity greater than 1 S/cm.

13. The rechargeable lithium cell of claim 1, wherein said phthalocyanine compound is lodged in a pore or a plurality of pores of said meso-porous structure to form a hybrid structure having a specific surface area greater than 50 m$^2$/g.

14. The rechargeable lithium cell of claim 1, wherein said phthalocyanine compound is lodged in a pore or a plurality of pores of said meso-porous structure to form a hybrid structure having a specific surface area greater than 100 m$^2$/g.

15. The rechargeable lithium cell of claim 1, wherein said phthalocyanine compound is lodged in a pore or a plurality of pores of said meso-porous structure and the phthalocyanine compound lodged in a pore has a dimension smaller than 20 nm.

16. The rechargeable lithium cell of claim 1, wherein said phthalocyanine compound is lodged in a pore or a plurality of pores of said meso-porous structure and the phthalocyanine compound lodged in a pore has a dimension smaller than 10 nm.

17. The rechargeable lithium cell of claim 1, wherein said prelithiated lithium storage material is selected from: (a) a pre-lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), iron (Fe), cadmium (Cd), or a mixture thereof; (b) a pre-lithiated alloy or intermetallic compound of Si, Ge, Sn, Pb, Sb, Bi, Zn, Al, Ti, Fe, Co, Ni, Mn, Cd, or a mixture thereof; (c) a pre-lithiated oxide, carbide, nitride, sulfide, phosphide, selenide, telluride, or antimonide of Si, Ge, Sn, Pb, Sb, Bi, Zn, Al, Fe, Ti, Co, Ni, Mn, Cd, or a mixture or composite thereof; (d) a pre-lithiated salt or hydroxide of Sn; or (e) a pre-lithiated carbon or graphite material.

18. The rechargeable lithium cell of claim 1, wherein the lithium storage material is selected from graphite worms, exfoliated graphite flakes, expanded graphite, chemically treated graphite with an inter-graphene planar separation no less than 0.4 nm, chemically etched or expanded soft carbon, chemically etched or expanded hard carbon, exfoliated activated carbon, chemically etched or expanded carbon black, chemically expanded multi-walled carbon nano-tube, chemically expanded carbon nano-fiber, or a combination thereof, wherein this lithium storage material has surface areas to capture and store lithium thereon and has a specific surface area greater than 50 m$^2$/g in direct contact with said electrolyte.

19. The rechargeable lithium cell of claim 1, wherein said hybrid cathode active material further comprises a carbon material coated on or in contact with a particle of said phthalocyanine compound and wherein said carbon material is selected from carbonized resin, amorphous carbon, chemical vapor deposition carbon, carbon black, acetylene black, activated carbon, fine expanded graphite particle with a dimension smaller than 100 nm, artificial graphite particle, natural graphite particle, or a combination thereof.

20. A rechargeable lithium cell of comprising:
(a) an anode comprising an anode active material, wherein said anode active material is a prelithiated lithium storage material or a combination of a lithium storage material and a lithium ion source selected from lithium metal, lithium alloy, or lithium-containing compound, wherein said prelithiated lithium storage material contains a mixture of a high capacity anode material and a high rate capable anode material, wherein said high rate capable anode material is selected from nano-scaled particles or filaments of a lithium transition metal oxide, lithiated CO$_3$O$_4$, lithiated Mn$_3$O$_4$, lithiated Fe$_3$O$_4$, Li$_4$Ti$_5$O$_{12}$, or a combination thereof, and said high capacity anode material is selected from pre-lithiated Si, Ge, Sn, SnO, or a combination thereof;
(b) a cathode comprising a hybrid cathode active material consisting of a meso-porous structure of a carbon, graphite, metal, or conductive polymer and a phthalocyanine compound, wherein said phthalocyanine compound is selected from copper phthalocyanine, zinc phthalocyanine, tin phthalocyanine, iron phthalocyanine, lead phthalocyanine, nickel phthalocyanine, cobalt phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, silver phthalocyanine, a metal-free phthalocyanine, a chemical derivative thereof, or a combination thereof, and wherein said meso-porous structure is in an amount of from 1% to 99% by weight based on the total weight of the meso-porous structure and the phthalocyanine compound combined, and wherein said meso-porous structure has a meso-scale pore with a size from 2 nm to 50 nm to accommodate the phthalocyanine compound therein; and
(c) electrolyte or a combination of electrolyte and a porous separator, wherein said separator is disposed between said anode and said cathode and the electrolyte is in ionic contact with said anode and said cathode.

21. The rechargeable lithium cell of claim 1, wherein said prelithiated lithium storage material has a specific capacity of no less than 500 mAh/g based on the anode active material weight.

22. The rechargeable lithium cell of claim 1, wherein said prelithiated lithium storage material has a specific capacity of no less than 1,000 mAh/g based on the anode active material weight.

23. The rechargeable lithium cell of claim 1, wherein said prelithiated lithium storage material has a specific capacity of no less than 2,000 mAh/g based on the anode active material weight.

24. The rechargeable lithium cell of claim 1, wherein the electrolyte contains an organic liquid electrolyte, ionic liquid electrolyte, gel electrolyte, polymer electrolyte, solid electrolyte, or a combination thereof.

25. A lithium cell comprising:
(A) an anode composed of an anode current collector and an anode active material, wherein said anode active material is a prelithiated lithium storage material or a lithium ion source selected from lithium metal, lithium alloy, or lithium-containing compound;
(B) a cathode comprising a hybrid cathode active material consisting of a porous structure of a carbon, graphite, metal, or conductive polymer and a phthalocyanine compound, wherein said phthalocyanine compound is selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, silver phthalocyanine, a metal-free phthalocyanine, a chemical derivative thereof, or a combination thereof, and wherein said porous structure is in an amount of from 1% to 99% by weight based on the total weight of the porous structure and the phthalocyanine compound combined, and wherein said porous structure has a pore with a size from 1 nm to 100 nm to accommodate phthalocyanine compound therein; and
(C) an electrolyte, or combined electrolyte and a porous separator, wherein the separator is disposed between said anode and said cathode and the electrolyte in ionic contact with said anode and said cathode.

26. The rechargeable lithium cell of claim 25, wherein said porous structure is made from a material selected from graphene, graphene oxide, reduced graphene oxide, graphene fluoride, doped graphene, functionalized graphene, expanded graphite with an inter-graphene spacing greater than 0.4 nm, exfoliated graphite or graphite worms, chemically etched or expanded soft carbon, chemically etched or expanded hard carbon, exfoliated activated carbon, chemically etched or expanded carbon black, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-graphene planar separation no less than 0.4 nm, chemically expanded carbon nano-fiber, chemically activated carbon nano-tube, chemically treated carbon fiber, chemically activated graphite fiber, chemically activated carbonized polymer fiber, chemically treated coke, meso-phase carbon, meso-porous carbon, or a combination thereof.

27. The rechargeable lithium cell of claim 26, wherein said expanded spacing is greater than 0.5 nm or said meso-porous structure has a specific surface area greater than 100 $m^2/g$.

28. The rechargeable lithium cell of claim 25, wherein said porous structure is made from a graphene material selected from a single-layer sheet or multi-layer platelet of graphene, graphene oxide, fluorinated graphene, halogenated graphene, hydrogenated graphene, nitrogenated graphene, pristine graphene, doped graphene, boron doped graphene, nitrogen doped graphene, chemically treated graphene, reduced graphene oxide, functionalized graphene, functionalized graphene oxide, or a combination thereof, and wherein this graphene material alone or in combination with at least another material forms a porous structure having a pore size from 1 nm to 100 nm.

29. The rechargeable lithium cell of claim 25, wherein said porous structure is selected from metal foam, carbon-coated metal foam, graphene-coated metal foam, metal web or screen, carbon-coated metal web or screen, graphene-coated metal web or screen, perforated metal sheet, carbon-coated porous metal sheet, graphene-coated porous metal sheet, metal fiber mat, carbon-coated metal-fiber mat, graphene-coated metal-fiber mat, metal nanowire mat, carbon-coated metal nanowire mat, graphene-coated metal nano-wire mat, surface-passivated porous metal, porous conductive polymer film, conductive polymer nano-fiber mat or paper, conductive polymer foam, carbon foam, carbon aerogel, carbon xerox gel, graphene foam, graphene oxide foam, reduced graphene oxide foam, or a combination thereof.

30. The rechargeable lithium cell of claim 25, wherein said porous structure has a specific surface area greater than 100 $m^2/g$.

31. The rechargeable lithium cell of claim 25, wherein said porous structure has a specific surface area greater than 500 $m^2/g$.

32. The rechargeable lithium cell of claim 25, wherein said lithium storage material is selected from: (a) silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), iron (Fe), cadmium (Cd), or a mixture thereof; (b) alloy or intermetallic compound of Si, Ge, Sn, Pb, Sb, Bi, Zn, Al, Ti, Fe, Co, Ni, Mn, Cd, or a mixture thereof; (c) oxide, carbide, nitride, sulfide, phosphide, selenide, telluride, or antimonide of Si, Ge, Sn, Pb, Sb, Bi, Zn, Al, Fe, Ti, Co, Ni, Mn, Cd, or a mixture or composite thereof, (d) salt or hydroxide of Sn; or (e) a carbon or graphite material.

\* \* \* \* \*